(12) United States Patent
Oberbeck et al.

(10) Patent No.: US 9,730,016 B2
(45) Date of Patent: Aug. 8, 2017

(54) BROADCAST OF CONTENT DATA TO GEOGRAPHIC AREAS BY DEVICES

(71) Applicant: Google Inc., Mountain View, CA (US)

(72) Inventors: John Woodbridge Oberbeck, Sunnyvale, CA (US); Roger Tawa, Jr., Brossard, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/814,897

(22) Filed: Jul. 31, 2015

(65) Prior Publication Data

US 2017/0034654 A1 Feb. 2, 2017

(51) Int. Cl.

| | |
|---|---|
| H04L 29/06 | (2006.01) |
| H04M 11/04 | (2006.01) |
| H04W 24/00 | (2009.01) |
| H04W 4/02 | (2009.01) |
| H04L 12/58 | (2006.01) |
| H04L 12/18 | (2006.01) |
| H04L 29/08 | (2006.01) |
| H04N 21/258 | (2011.01) |
| H04N 21/442 | (2011.01) |
| H04N 21/6405 | (2011.01) |

(52) U.S. Cl.
CPC ............ H04W 4/021 (2013.01); H04L 12/18 (2013.01); H04L 29/08657 (2013.01); H04L 51/32 (2013.01); H04N 21/25841 (2013.01); H04N 21/44213 (2013.01); H04N 21/6405 (2013.01); H04W 4/02 (2013.01)

(58) Field of Classification Search
CPC .................................................... H04H 20/59
USPC ................................ 455/404.1, 414.3, 456.3
See application file for complete search history.

(56) References Cited

U.S. PATENT DOCUMENTS

| | | | |
|---|---|---|---|
| 6,018,768 A | 1/2000 | Ullman et al. | |
| 7,729,709 B1 | 6/2010 | Loeb et al. | |
| 8,095,153 B2* | 1/2012 | Jenkins | G06F 17/3087 455/414.1 |
| 8,588,818 B2 | 11/2013 | Huang et al. | |
| 2003/0193394 A1* | 10/2003 | Lamb | G08B 27/006 340/539.28 |
| 2005/0009508 A1* | 1/2005 | Graske | H04M 3/487 455/414.3 |

(Continued)

OTHER PUBLICATIONS

Cranshaw, John et al. "Bridging the Gap Between Physical Location and Online Social Networks." CMU-ISR-10-107. Institute for Software Research, School of Computer Science, Carnegie Mellon University. Mar. 2010. All pages.

(Continued)

*Primary Examiner* — Joshua Schwartz
(74) *Attorney, Agent, or Firm* — IP Spring

(57) ABSTRACT

Implementations generally relate to broadcast of content data to geographic areas by devices. In some implementations, a computer-implemented method to broadcast data includes obtaining an indication at a first device to broadcast a content post, determining a broadcast area based on a stored broadcast history for one or more previous content posts related to the content post, and broadcasting the content post. The broadcast is configured such that the content post is to be received by one or more receiving devices located in the broadcast area.

20 Claims, 10 Drawing Sheets

(56) References Cited

U.S. PATENT DOCUMENTS

| | | | |
|---|---|---|---|
| 2007/0065107 A1* | 3/2007 | Ryu | G11B 27/034 |
| | | | 386/201 |
| 2007/0184820 A1* | 8/2007 | Marshall | G06Q 30/02 |
| | | | 455/414.3 |
| 2008/0126476 A1 | 5/2008 | Nicholas et al. | |
| 2008/0188261 A1 | 8/2008 | Arnone | |
| 2008/0305781 A1* | 12/2008 | Wilson | H04M 3/42 |
| | | | 455/414.1 |
| 2009/0055485 A1 | 2/2009 | Tsai et al. | |
| 2011/0009102 A1 | 1/2011 | Almodovar Herraiz et al. | |
| 2011/0103302 A1* | 5/2011 | Hall | A63F 13/10 |
| | | | 370/328 |
| 2011/0130087 A1 | 6/2011 | Cilli et al. | |
| 2012/0252494 A1 | 10/2012 | Parker et al. | |
| 2013/0046826 A1 | 2/2013 | Stanton | |
| 2014/0156746 A1 | 6/2014 | Wheatley | |
| 2015/0213497 A1 | 7/2015 | Jain et al. | |

OTHER PUBLICATIONS

"Yik Yak Social Networking App Review." Apptism. Nov. 6, 2013; accessed Jun. 10, 2015. http://www.apptism.com/social-networking/locus-engineering-llc/yik-yak/. All pages.

European Patent Office, International Search Report for International Patent Application No. PCT/US2016/044501, Oct. 14, 2016, 5 pages.

European Patent Office, Written Opinion for International Patent Application No. PCT/US2016/044501, Oct. 14, 2016, 9 pages.

Sun, et al., "Location Aided Broadcast in Wireless Ad Hoc Network Systems", Wireless Communications and Networking Conference, 2002, WCNC2002, 200 2 IEEE, Piscataway, NJ, vol. 2, Mar. 17, 2002, pp. 597-602.

* cited by examiner

| USER POSTS | BROADCAST HISTORY |
|---|---|
| POST P1 | L0 → L1 → L10 |
| | L0 → L2 → L11 |
| | L0 → L2 → L12 |
| | L0 → L3 → L4 → L13 |
| | L0 → L3 → L5 → L14 |
| | L0 → L6 → L7 → L15 |
| POST P2 | L0 → L20 → L21 |
| | L0 → L22 → L23 |
| | L0 → L24 → L25 |
| | L0 → L24 → L26 → L27 |
| POST P3 | L0 → L30 → L31 |
| | L0 → L32 → L33 |

| TOPICS 901 | TOPIC POSTS 902 | BROADCAST HISTORY 904 |
|---|---|---|
| TOPIC T1 | POST P6 | L50 → L51 → L52 → L53 → L60 |
| | | L50 → L51 → L52 → L53 → L61 |
| | | L50 → L51 → L54 → L62 |
| | | L50 → L55 → L63 |
| | | L50 → L56 → L64 |
| | | L50 → L57 → L65 |
| | | L50 → L58 → L59 |
| | POST P7 | L70 → L71 → L72 |
| | | L70 → L73 → L74 |
| TOPIC T2 | POST P8 | L80 → L81 → L82 |
| | | L80 → L83 → L84 |
| | | L80 → L83 → L85 |
| | | L80 → L86 → L87 |

BROADCAST OF CONTENT DATA TO GEOGRAPHIC AREAS BY DEVICES

BACKGROUND

The popularity and convenience of digital devices as well as the widespread of use of Internet communications have allowed devices to communicate information in a variety of ways. For example, user devices can communicate with each other via wireless communication and using network services providing instant messaging or chat sessions. Some applications can make use of user location sensed by user devices, e.g., by GPS sensors, to enable particular communications. For example, "geofencing" applications can allow communication of information between user devices based on those devices entering defined geographic areas.

SUMMARY

Implementations generally relate to broadcast of content data to geographic areas by devices. In some implementations, a computer-implemented method to broadcast data includes obtaining an indication at a first device to broadcast a content post, determining a broadcast area based on a stored broadcast history for one or more previous content posts related to the content post, and broadcasting the content post. The broadcast is configured such that the content post is to be received by one or more receiving devices located in the broadcast area.

Various implementations and examples of the method are described. For example, the stored broadcast history can indicate one or more geographical locations where the previous content posts related to the content post were previously received and broadcast by one or more previous receiving devices. The content post can be a user content post including content data provided by a user, and the stored broadcast history can be a stored user broadcast history, where the one or more previous content posts are related to the content post via the user, who initiated the content post and initiated the one or more previous content posts. The stored broadcast history can relate to the one or more previous content posts that were broadcast from one or more locations within a threshold distance of a geographical location of the first device.

In some implementations, the stored broadcast history can indicate a magnitude of a geographical area over which the one or more previous content posts were re-broadcast by one or more previous receiving devices, and determining the broadcast area can include modifying the broadcast area based on the magnitude. Determining the broadcast area can be based on one or more previous broadcast areas of the one or more previous content posts sent from one or more previous geographical locations, and can include modifying the broadcast area based on a distance of a geographical location of the device to at least one of the one or more previous geographical locations.

The stored broadcast history can be related to content data of the content post, and one or more previous content posts can include at least a portion of content data similar to the content data of the content post. Determining the broadcast area can include determining a resulting broadcast area based on a plurality of broadcast areas associated with the one or more previous content posts, and determining the broadcast area based on the resulting broadcast area. The content data can include one or more topics and the stored data broadcast history can include a stored topic broadcast history, such that determining the broadcast area can include referencing one or more stored region topics previously broadcast in a region that includes a geographical location of the first device, determining that the one or more topics in the content post are similar to one or more corresponding region topics of the one or more stored region topics, and using one or more individual broadcast histories associated with the corresponding region topics to determine the broadcast area. Determining the broadcast area can include using a rank of the one or more region topics to scale the broadcast area, where the one or more region topics are ranked based at least in part on a number of times that the one or more region topics have been broadcast by users.

In some examples, the broadcast history can be stored as one or more directed graphs of geographical locations indicating one or more directions of broadcast flow of associated previous content posts across one or more previous receiving devices at the geographical locations. The stored broadcast history can include a broadcast history of the user that indicates one or more geographic locations where one or more previous user posts from the user were broadcast by a first set of devices that received the one or more previous user posts, and a broadcast history of one or more topics associated with the content post, indicating one or more geographic locations where one or more previous topic posts associated with least one of the one or more topics were broadcast by a second set of devices that received the one or more previous topic posts, where the broadcast area is based on the broadcast history of the user and the broadcast history of the one or more topics.

In some implementations, a system to broadcast data includes a storage device and at least one processor operative to access the storage device. The processor is configured to receive a content post in a received broadcast sent by a sending device and store the content post in the storage device, obtain an indication to broadcast the content post, determine a re-broadcast area based on a stored broadcast history associated with a user of the system, and broadcast the content post, where the content post is configured to be received by one or more receiving devices located in the re-broadcast area.

Various implementations and examples of the system are described. For example, the processor can be configured to determine the re-broadcast area based on the stored broadcast history for one or more previous content posts sent by a user of the system. The processor can be configured to receive the content post in a received broadcast that originated from the sending device, or in a received broadcast that is a re-broadcast by the sending device based on a previous broadcast received by the sending device. The system can further include a display device, where the processor can be further configured to cause a display of the content post by the display device, and the stored broadcast history can indicate one or more geographic locations where the one or more previous content posts sent by the user were broadcast by one or more previous receiving devices receiving the one or more previous content posts.

The content post can be associated with a current broadcast history including one or more geographical locations at which the content post was previously broadcast by one or more previous receiving devices, where the processor is further configured to store a current geographical location of the system in the current broadcast history of the content post. The processor can be configured to store the current broadcast history of the content post as a directed graph of geographical locations, and add the current geographical location as a node to the directed graph. The processor can be configured to modify the re-broadcast area based at least in part on a number of content posts initiated in a geographic region of the device by one or more initiating devices.

In some implementations, a non-transitory computer readable medium has stored thereon software instructions to implement broadcast of content data and, when executed by a processor, cause the processor to perform operations. The operations can include receiving a command at a device from a user to broadcast a content post stored by the device, and determining an initial broadcast area based on a stored broadcast history of the user relating to previous content posts sent by the user, and a stored broadcast history related to content data included in the content post. The operations can include broadcasting the content post, where the content post is configured to be received by one or more devices in the broadcast area.

In some implementations, a device includes means for obtaining an indication at a first device to broadcast a content post, means for determining a broadcast area based on a stored broadcast history for one or more previous content posts related to the content post, and means for broadcasting the content post. The broadcast is configured such that the content post is to be received by one or more receiving devices located in the broadcast area. Various implementations and examples of the device are described. For example, the stored broadcast history can indicate one or more geographical locations where the previous content posts were previously received and broadcast by one or more previous receiving devices. The content post can be a user content post including content data provided by a user. The stored broadcast history can be a stored user broadcast history, where the previous content posts are related to the content post via the user who initiated the content post and initiated the previous content posts. The stored broadcast history can relate to the previous content posts that were broadcast from one or more locations within a threshold distance of a geographical location of the first device. The stored broadcast history can indicate a magnitude of a geographical area over which the one or more previous content posts were re-broadcast by one or more previous receiving devices, and the means for determining the broadcast area can include means for modifying the broadcast area based on the magnitude. The means for determining the broadcast area can use one or more previous broadcast areas of the one or more previous content posts sent from one or more previous geographical locations, and can include means for modifying the broadcast area based on a distance of a geographical location of the device to at least one of the one or more previous geographical locations.

The stored broadcast history can be related to content data of the content post, and one or more previous content posts can include at least a portion of content data similar to the content data of the content post. The means for determining the broadcast area can include means for determining a resulting broadcast area based on a plurality of broadcast areas associated with the one or more previous content posts, and means for determining the broadcast area based on the resulting broadcast area. The content data can include one or more topics and the stored data broadcast history can include a stored topic broadcast history, such that the means for determining the broadcast area can include means for referencing one or more stored region topics previously broadcast in a region that includes a geographical location of the first device, means for determining that the one or more topics in the content post are similar to one or more corresponding region topics of the one or more stored region topics, and means for using one or more individual broadcast histories associated with the corresponding region topics to determine the broadcast area. The means for determining the broadcast area can include means for using a rank of the one or more region topics to scale the broadcast area, where the one or more region topics are ranked based at least in part on a number of times that the one or more region topics have been broadcast by users. In some examples, the broadcast history can be stored as one or more directed graphs of geographical locations indicating one or more directions of broadcast flow of associated previous content posts across one or more previous receiving devices at the geographical locations.

DETAILED DESCRIPTION

Figure 1:
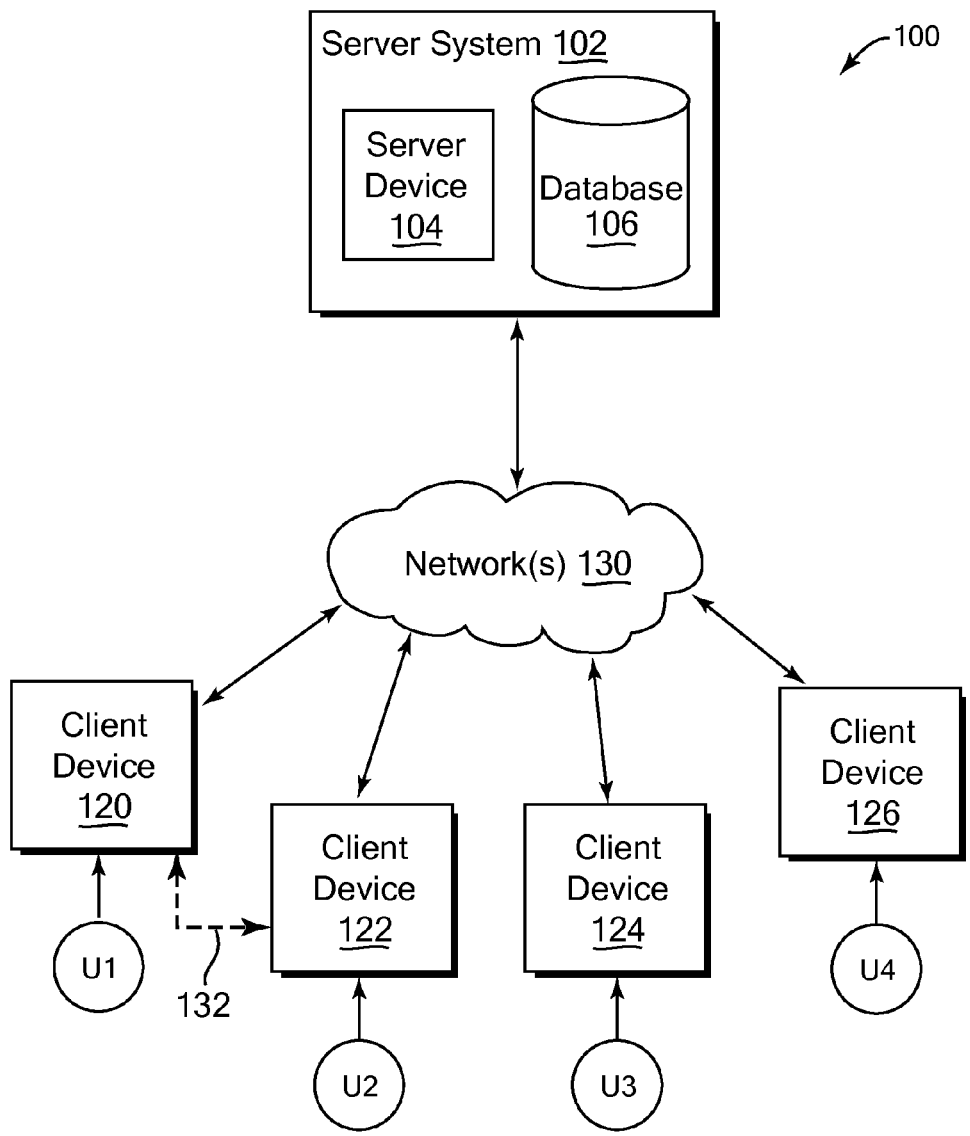
FIG. 1 is a block diagram of an example network environment which may be used for one or more implementations described herein.

One or more implementations described herein generally relate to broadcast of content data to geographic areas by devices. In some example implementations, a first device (e.g., mobile device or any computer device) can receive an indication (e.g., command from a user) to broadcast a content post to a broadcast area via wireless transmission from a geographical location of the first device. In some examples, the content post can include text, images, or other types of content, and can be created by the user of the first device. The broadcast area can be an initial broadcast area for the content post, e.g., where the content post is a new post for broadcast. The initial broadcast area can be based on a stored broadcast history related to the content post, e.g., a broadcast history that indicates or describes related previous content posts that were broadcast over geographic areas in the past. The content post is broadcast from the first device to be received by one or more devices in the initial broadcast area. In one example, the first device can send the content post to a server or other device that can then send the content post to devices that it has determined (e.g., based on received location data from the devices, such as GPS data) to be currently located in the initial broadcast area. Other examples can broadcast the post directly from the first device to one or more other devices, e.g., via peer-to-peer networks.

Each user of a receiving second device can decide whether to re-broadcast a received content post to other devices in a defined re-broadcast area. For example, a second device located in the initial broadcast area can receive and display the content post broadcast by the first device. The second device can receive an indication, such as a command by a user of the second device, to broadcast the content post to a re-broadcast area. In some implementations, the re-broadcast area can be based on a stored broadcast history associated with the user of the second device. The content post is broadcast from the second device to be received by one or more devices in the re-broadcast area. In one example, the second device can send the content post to a server or other device that can send the content post to any devices it has determined to be currently located in the re-broadcast area and which did not already receive the content post in a previous broadcast. The receiving device's location can also be added as a node to the broadcast history of the current post. In this way, a current content post can propagate across geographic areas via re-broadcasts by devices that receive the current content post.

Various implementations can determine a broadcast area (e.g., initial broadcast area) for a content post in a variety of ways, based on a stored broadcast history related to the (current) content post. The stored broadcast history can describe how previous content posts were previously broadcast and re-broadcast by devices. For example, the history can describe the geographical locations and direction of propagation of broadcasts of the previous posts by devices, and/or a total geographical area or footprint covered by the broadcasts. In some examples, the stored broadcast history can include a user broadcast history that indicates previous content posts that were previously initiated by the same user that initiated the current content post. The broadcast areas of the previous content posts can be combined to find a resulting user broadcast area for the user. Furthermore, in some implementations, the stored broadcast history can include a data broadcast history of previous posts having content data related to content data included in the current content post. In one example, the related content data can include one or more topics, e.g., where a topic broadcast history can indicate previous content posts that included one or more topics that are similar to topics in the current content post. Broadcast areas of the related previous topic posts can be combined to find a resulting topic broadcast area for topics. In some implementations, a total initial broadcast area can be determined based on a combination of the resulting broadcast areas for the user and the related topics (or based on a different type of result derived from those resulting broadcast areas). In some implementations, topics can be ranked for popularity (e.g., the number of times they are included in broadcast content posts, based on weights of influence of the users broadcasting the posts, recency of topics in the post, etc.), and in some examples, posts having more popular topics can be provided with a greater broadcast area.

The re-broadcast area for the broadcast by the second device can be similarly determined, e.g., size and/or shape of the re-broadcast area based on total broadcast areas covered by previous content posts initiated by the user of the second device. Some implementations can scale the re-broadcast area to be smaller than the initial broadcast area for the content post.

Various features and implementations enable propagation of user content and other content in dynamic patterns over geographic areas using broadcasts of the content via wireless communication. Using one or more described features, content posts can be broadcast into geographic areas that are adaptive, dynamically determined, and relevant to the initiating user and/or the content of the post. In some examples, content posts can be broadcast into relevant geographic areas that can be changing, e.g., as a related event changes and evolves. For example, examining and using a stored broadcast history for previous content posts can allow initial broadcast areas and re-broadcast areas for new content posts to be sized and shaped for geographic areas that are likely to have users who find the post interesting and will share the post to other devices in re-broadcasts, based on popularity and geographic extent of related posts previously broadcast in the same region. Some implementations can thereby broadcast content posts taking into account different groups or populations having different interests over a geographical region. Users who sent popular and wide-ranging content posts in the past can be automatically provided with an initial broadcast area and re-broadcast areas that are larger than for users sending less popular and wide-ranging posts. Initial broadcast areas and re-broadcast areas can be shaped based on geographical areas covered by broadcasts of related previous posts. Thus, described features can provide adaptive broadcast areas for content posts transmitted by devices.

These and other described features allow content data to be spread naturally and organically in any sized or shaped geographic region, including asymmetrical regions. For example, a content post may spread in various directions within a geographic region as far as the post is interesting enough to users to continue to be re-broadcast to other users, thus expanding beyond any predefined geographical borders. In some examples, described broadcast features can be used to spread relevant information for an event or one or more topics in an asymmetrically-shaped and/or dynamically changing geographic region, such as regions having players following a marathon race, parade, block party, commute, beach area, etc. In some implementations, one or more described features can reduce the processing and communication network resources needed to broadcast content to relevant areas. For example, more relevant broadcast areas can be determined based on broadcast history as described herein, saving the processing and bandwidth resources used to broadcast content to areas not as relevant to the user or to the content data in posts. In another example, described features can automatically broadcast content posts to relevant geographic areas without a user having to manually select such areas, thus reducing user time and effort and saving user resources. Furthermore, stored and updated broadcast histories of content posts can provide directions of propagation of content, which can be examined to discover the geographic sources of particular content, e.g., for trend analysis, marketing purposes, etc.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide a communication application program. The communication program may allow a system (e.g., client device or server system) to provide options for communicating with other devices, some examples of which are described herein. The communication program can provide one or more associated user interfaces that are displayed on a display device associated with the server system or client device. The user interface may provide various options to a user to select communication modes, users or devices with which to communicate, etc. In some examples, the communication program can provide an option to broadcast a content post to a broadcast area, and/or can output a notification indicating that a content post has been received by the device and the device is in the defined broadcast area for the post. The communication program can display or otherwise output transmitted content posts and received content posts, e.g., in any of a variety of formats.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
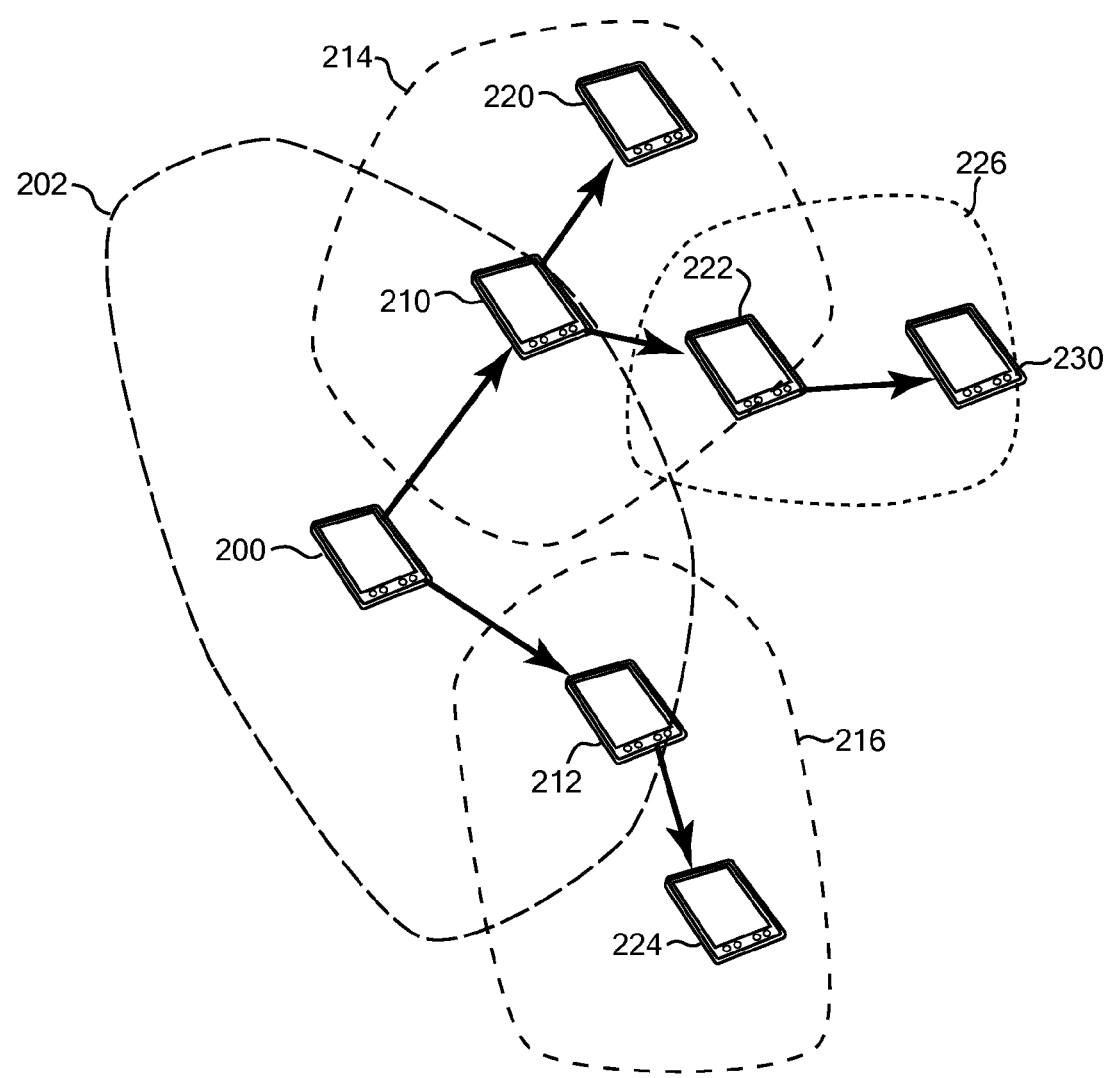
FIG. 2 is a diagrammatic illustration of an example broadcast of a content post to multiple devices in a geographic area using one or more features described herein.

FIG. 2 is a diagrammatic illustration of an example broadcast of a content post to multiple devices in a geographic area using one or more features described herein. In this example, a first device 200 (e.g., originating device) originates a broadcast of a user content post. For example, a first user of the first device 200 may have input and/or otherwise designated content data to be broadcast in the user content post. Other types of content posts, or other data transmissions, can be broadcast using one or more described features in other implementations.

The first device 200 determines an initial broadcast area 202 using a stored broadcast history related to the content post. For example, the initial broadcast area 202 can be an irregularly-shaped area based on the geographical extent of broadcast of previous related posts, e.g., related to the current post by originating user and/or content data. In other cases, the initial broadcast area can be regularly shaped and scaled in magnitude based on the broadcast of previous related posts. The content post is broadcast to the initial broadcast area 202 such that other devices located in the initial broadcast area can receive the content post and output content data of the content post, e.g., display the content data on a display screen. In this example, devices 210 and 212 are shown to be located in the initial broadcast area and receive and display the content in the content post.

The users of the receiving devices 210 and 212 decide to re-broadcast the content post, e.g., where the re-broadcast can indicate that these users approve of the received content data and desire to share the content data with others. A re-broadcast area is determined by each of the devices 210 and 212, e.g., based on a broadcast history related to the respective users of these devices. For example, a re-broadcast area 214 is determined by device 210 and the content post is broadcast to this area 214. Similarly, a re-broadcast area 216 is determined by device 212 and the content post is broadcast to this area 216. Devices in these re-broadcast areas can receive and output the content post. In addition, the geographical locations of these devices 210 and 212 can be stored in a current broadcast history for the content post.

Devices 220 and 222 are located in the re-broadcast area 214 and receive and output the content post. In this example, the device 220 does not re-broadcast the content post further, and the device 222 is instructed to re-broadcast the post by the user of that device (e.g., via user input or automatically based on stored user preferences, user data, etc.). The device 222 determines a re-broadcast area 226, e.g., based on a broadcast history related to the user of that device. In addition, the location of the device 222 can be stored in a current broadcast history for the content post. A device 230 is located in the re-broadcast area 226 and its user does not re-broadcast the post. Similarly, a device 224 is located in the re-broadcast area 216 of device 212, receives and outputs the content post, and does not re-broadcast the post.

In this example, the content post has been re-broadcast organically over a total area based on user interest indicated by broadcast sharing of the content. A broadcast area determined for a particular device that is initially broadcasting or re-broadcasting a current content post can have a size and/or shape based on total geographic areas covered by related previous content posts that have been broadcast from similar locations. For example, a user may have previously initially broadcast content posts that were re-broadcast by other users/devices over a large and irregularly-shaped total geographic area, such that current content posts sent from a similar location by that same user can be assigned initial broadcast areas and/or re-broadcast areas having a similar larger size and/or irregular shape. In another example, previously-broadcast content posts from a particular location may have included popular content data and were re-broadcast by other devices over a large and/or irregular total geographic area, such that current content posts having similar content data (e.g., similar topics) can be assigned similarly larger and irregular initial broadcast areas and/or re-broadcast areas when sent from a similar location.

Figure 3:
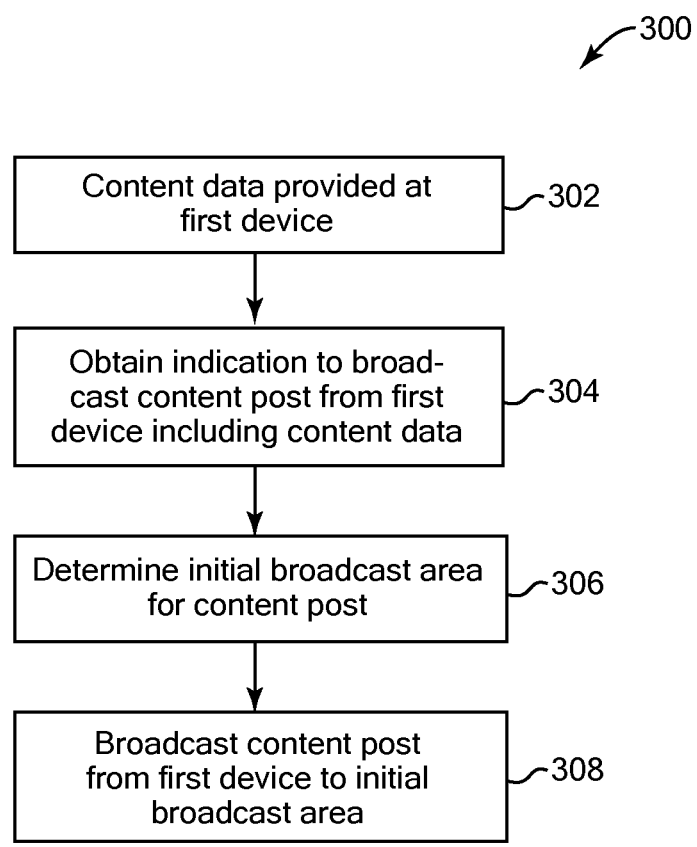
FIG. 3 is a flow diagram illustrating an example method to broadcast content data to an initial broadcast area, according to some implementations.

FIG. 3 is a flow diagram illustrating one example of a method 300 to broadcast content data (or other types of data) to a broadcast area, according to some implementations. In this example method, the broadcast area can be an initial broadcast area, e.g., a broadcast area to which a content post is initially broadcast, where the content post has not been previously broadcast by one or more devices.

In some implementations, method 300 can be implemented, for example, on a server system 102 as shown in FIG. 1. In other implementations, some or all of the method 300 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., an application being initiated by a user, receiving one or more content posts that have been newly uploaded to or accessible by the system, a predetermined time period having expired since the last performance of method 300, and/or one or more other conditions occurring which can be specified in settings read by the method. In some implementations, such conditions can be specified by a user in stored custom preferences of the user. In one example, the first device can be a camera, cell phone, tablet computer, wearable device, or other client device that can receive content input by a user to the client device, and can perform the method 300. In another example, a client device or server device can receive content data or one or more content posts uploaded from one or more users or received over a network connection, and can perform the method 300 for the content data. In another example, a client device can send content data or one or more content posts to a server over a network, and the server can process the content using method 300. Some implementations can initiate method 300 based on user input. A user (e.g., operator or end-user) may, for example, have selected the initiation of the method 300 from a displayed user interface, e.g., application user interface or other user interface. In some implementations, method 300 or portions thereof can be performed with guidance by the user. For example, a user can designate content data to be processed by method 300.

In block 302 of method 300, content data is provided at a first device. In some examples, the content data can be user content, e.g., content data that is provided by or originated from a user. For example, the content data can include one or more types of content. Types of content can include text, image data (e.g., one or more digital images composed of multiple pixels), video data (e.g., including multiple image frames), audio data, graphical data (e.g., object data, diagrams, etc.), documents in any of various formats, map data, traffic data, game data, polls, news, quizzes, lotteries, etc. In some implementations, the content data can be or include other types of content data, e.g., originating from sources other than users, including companies, organizations, or other entities, other devices, etc. The content data can be stored on one or more storage devices of the first device or accessible to the first device, e.g., stored on a connected storage device such as a local storage device or a storage device connected to or in communication with a network accessible to the system, and retrieved by the first device.

In some implementations, a user can provide or select content data to obtain for processing. For example, the content data can include text (e.g., in a text message) input by a user to the first device that is a mobile device, e.g., a cell phone, tablet, wearable device, etc. The user may have input the content data using any of a variety of input devices, including a touchscreen, keyboard or keypad, buttons, microphone and voice recognition device capability, motion gestures as detected by motion sensors of the first device, etc. The input device can be included in or connected to the first device, for example, or connected to a different device that provides the input data to the first device. In some implementations, the content data may be retrieved (e.g., automatically by application software running on the first device) from local and/or remote storage devices. For example, in some implementations, the first device can select and/or retrieve the content data from an accessible larger set of content data, e.g., based on evaluating one or more characteristics of the content data. Such characteristics can include timestamps and other metadata, recognized words or image features in the data, etc.

In block 304, an indication is obtained to broadcast a content post from the first device, where the content post includes the content data. In some examples, the obtained indication can be received from a user, e.g., a command selection by a user of a control or input device provided by or connected to the first device. In some implementations, the indication can be a command provided from the first device or one or more other devices, an application program or other software, etc. The indication can include one or more individual commands, instructions, or selections.

In some implementations, the indication can be obtained based on other criteria different than or in addition to user input. For example, stored user preferences can be examined which, e.g., have been previously designated by the user of the first device. Such user preferences may, for example, indicate whether or not the first device should automatically broadcast the content post without requiring human intervention such as user input. In some examples, the user preferences can indicate to automatically broadcast a content post under specified conditions, e.g., at particular geographic locations (or types of geographic locations) of the first device, and/or based on detecting that one or more particular users are in the same geographical region or within a threshold distance of the first device. If indicated condition(s) are met, the user post is designated in method 300 to qualify for re-broadcast. Similarly, other stored user data related to the first user can be examined to assist determining whether the content post should be automatically broadcast. For example, the user data can describe a history of previous broadcasts (original and/or re-broadcasts) in the past indicating that one or more previous broadcasts by the first user were sent in similar geographical regions and/or included content data that was similar to the current content post (e.g., in topics, type, etc.), such that the current content post qualifies for broadcast. Some conditions can be based on other user data, e.g., a history of previous activities of the first user, calendar data of the first user, social data of the first user (e.g., ratings, comments, shares, etc. of content by the second user as stored by a social networking service or other network services), etc., which can be used to indicate whether the current content post should be broadcast.

In block 306, an initial broadcast area is determined for the content post. In some implementations, the initial broadcast area can be a geographical area in which the content post will be received and/or output by receiving devices located in that area. In some implementations, an initial broadcast area can be associated with a content post that will be initially broadcast without having been previously broadcast by one or more devices. In some implementations, initially-broadcast content posts can be assigned a different broadcast area than content posts that are received from a broadcast by a different device and broadcast again by the receiving device (e.g., to a re-broadcast area as described below).

The initial broadcast area can be determined based on one or more of a number of factors. In some implementations, the initial broadcast area can be determined based on a stored broadcast history related to the content post (e.g., the new content post of block 304 can be considered a "current" content post). For example, the stored broadcast history can indicate one or more geographical locations where one or more previous content posts related to the current content post were received and re-broadcast by one or more other devices. A stored broadcast history can be stored on the first device and/or can be stored remotely, e.g., a server or remote storage device. In some implementations, the broadcast history can include one or more individual broadcast histories, where each individual broadcast history is associated with a previous content post. The previous content posts (and their individual broadcast histories) can be stored in (or associated with) one or more post histories, e.g., one or more stored data collections indicating one or more previous content posts that were previously broadcast. Some examples are described below.

The previous content posts in the broadcast history can be related to the current content post based on one or more characteristics of the posts. For example, one characteristic of the posts can be the user who initially broadcast the posts. In some examples, the stored broadcast history can include a user broadcast history indicating one or more previous posts that the user of the first device (or the first device) has previously initially broadcast from a location similar to (e.g., within a predefined distance of) the current location of the current content post (e.g., the current location of the first device). Another characteristic of the posts can be the content data included in the posts, e.g., one or more topics included in the content data of the posts, the type of the content data in the posts, etc. For example, the stored broadcast history can include a data broadcast history indicating one or more previous content posts that have been broadcast with similar content data to the content data to be included in the content post. For example, the data broadcast history can include a broadcast history of one or more topics included in the content data and that have been included in one or more previously-broadcast content posts initially broadcast near a location of the current content post or in a geographic region of the current content post. In some implementations, the initial broadcast area can be based on a total broadcast history that includes a broadcast history of the user and includes a broadcast history of the one or more topics. In another example, characteristics of the posts can include the time of broadcast and/or other characteristics.

In some implementations, each broadcast history can indicate one or more geographic locations where one or more previous content posts were approved (e.g., rated highly) by users of devices that received a broadcast of those posts. For example, a broadcast history may only store locations where a received initial broadcast of the previous content post was approved by users of receiving devices, and not store locations where the previous content post was re-broadcast. Such a broadcast history may only include an initial broadcast area and not include any re-broadcast areas where the previous content posts were broadcast by receiving devices. In some implementations, approvals provided for re-broadcasts can be stored. For example, some implementations can only store approvals (and not re-broadcasts) made by users of receiving devices in a broadcast history, where the method can determine an initial broadcast area based on the locations of the approvals. Some implementations of a broadcast history can store disapprovals, comments, and/or other information indicated by users of devices that received and/or output content data from a broadcast of a previous content post.

In some implementations, the factors on which the initial broadcast area can additionally be based can include characteristics of the user of the first device (e.g., user data including a social graph of user social connections, user travel and activity locations based on location data and user data, etc.), user preferences (e.g., indicating desired large or small initial broadcast areas), characteristics of the first device (e.g., type of device such as mobile device, desktop device, etc.), characteristics of the content data (e.g., content type, content topics), characteristics of the geographical area surrounding the first device (e.g., certain geographical areas being prohibited from broadcasts), characteristics of a time of day, date, or event, or other condition related to the first device, user, or current geographical area, etc.

Some implementations can determine multiple previous broadcast areas of previous posts related to the first user, to the content data, and/or to other post characteristics. Multiple previous broadcast areas can be combined to determine the initial broadcast area for the current content post. Some examples of determining an initial broadcast area based on examples of a stored broadcast history are described below with respect to FIG. 5.

In some implementations, the determination of the initial broadcast area can include modifying the initial broadcast area. For example, an initial broadcast area based on a stored broadcast history can be scaled based on distance of current location of the first device compared to an originating broadcast location of previous content posts, a geographical extent of broadcast of previous content posts, and/or other factors. An initial broadcast history can be shaped differently based on similar factors. For example, a broadcast history may indicate that particular geographical areas are more popular for particular topics and/or users, and can modify the shape of the initial broadcast area to include those areas. Similarly, based on broadcast history, particular areas may be determined to be less popular for the first user or included topics, causing the shape of the initial broadcast area to be changed by removing (or scaling down) corresponding portions of the initial broadcast area. Some examples are described below with respect to FIG. 5.

In block 308, the content post is broadcast from the first device to the initial broadcast area determined in block 306. For example, the content post can be sent as one or more packets or other structures of data including the content data and other data used in the transmission and reception of the post. In some examples, a content post can include the content data as well as a user identification (ID) of the user (and/or ID of the first device), an application identification for the application sending the content post, location data indicating a geographical location of the first device, data describing the determined initial broadcast area (e.g., geographical locations included in the initial broadcast area and/or an area boundary determined therefrom), related parameters (e.g., user anonymity status, user preferences, device operating characteristics, etc.), and/or other information.

The broadcast of the content post to the initial broadcast area can be implemented in any of various ways. For example, the content post can be sent from a particular communication application program running on the first device. The application program can send the content post to a server that is in communication with the first device, e.g., over various wireless and/or wired networks. For example, some implementations can use a server running appropriate server software. In some implementations, the server may periodically (or otherwise) receive updates from various devices (e.g., running a compatible communication application program or other software) and which are in communication with the server, where each update includes location data indicating a current or recent geographical location of an associated device that sent the update. In some implementations, the server may have stored data indicating the geographical locations of one or more devices, e.g., IP addresses or MAC addresses of devices associated with particular locations and connected to wired or wireless networks. The server can examine the location data from the devices to determine which devices are located within the initial broadcast area (e.g., where the initial broadcast area may be defined in the content post in some implementations). The server can send the content post to those devices (e.g., only to those devices) that are determined to be located within the initial broadcast area, e.g., over wireless and/or wired networks. For example, in some implementations the server can send the content post to detected devices that are providing locations to the server (e.g., running compatible communication software).

In some implementations, devices can include the ability to communicate using peer-to-peer networks. For example, such functionality can allow user devices to directly communicate with each other without needing to communicate content posts (and/or other data) with server systems. In some implementations, a transmitter and receiver can be included on each device for such peer-to-peer communication. In some examples, the first device can transmit the content post wirelessly over a peer-to-peer network, and other devices in communication with the first device over the peer-to-peer network (e.g., within a wireless communication range) can receive the content post. The content post can include data that indicates the initial broadcast area. Some implementations can use intermediary devices to receive and retransmit the content post. In some implementations, each device that receives the post can compare a received initial broadcast area with its own current location to determine whether it is within the initial broadcast area, and if so, output (e.g., display) the content post by the receiving device for its user. (Devices can similarly check a received re-broadcast area, described below.) If a device determines that it is not within the initial broadcast area, that device can ignore the content post, e.g., the device will not provide output such as a display of the content data in the content post. Herein, the term "receiving device," when used in context of receiving broadcasts of content posts, generally refers to a device that receives the broadcast and is located in the broadcast area intended for the broadcast, and does not generally refer to a device that may actually receive a broadcast but determine that it is not in the intended broadcast area and so ignores or does not act upon that broadcast.

Other techniques for broadcasting the content post can be used in some implementations. An example method describing a device receiving and processing a content post is described with respect to FIG. 4.

Some implementations can broadcast and receive continuous or streaming content data in one or more user posts that are broadcast via features described herein. For example, a stream of video content, audio content, or other content can be sent in multiple posts broadcast by the first device, where the broadcasts can be transmitted periodically and continuously. In some implementations, a determined frequency or density of broadcast posts can be maintained by the first device and/or other devices by adjusting their broadcast areas in size and/or shape (described below), such that that receiving devices can receive and display new content posts at that frequency. For example, this feature can be used to reduce the rate of received posts such that receiving devices do not flood their users with too many content posts in a particular period of time, and/or can be used to increase the rate of received posts if a receiving device is not receiving many posts in the period of time.

Figure 4:
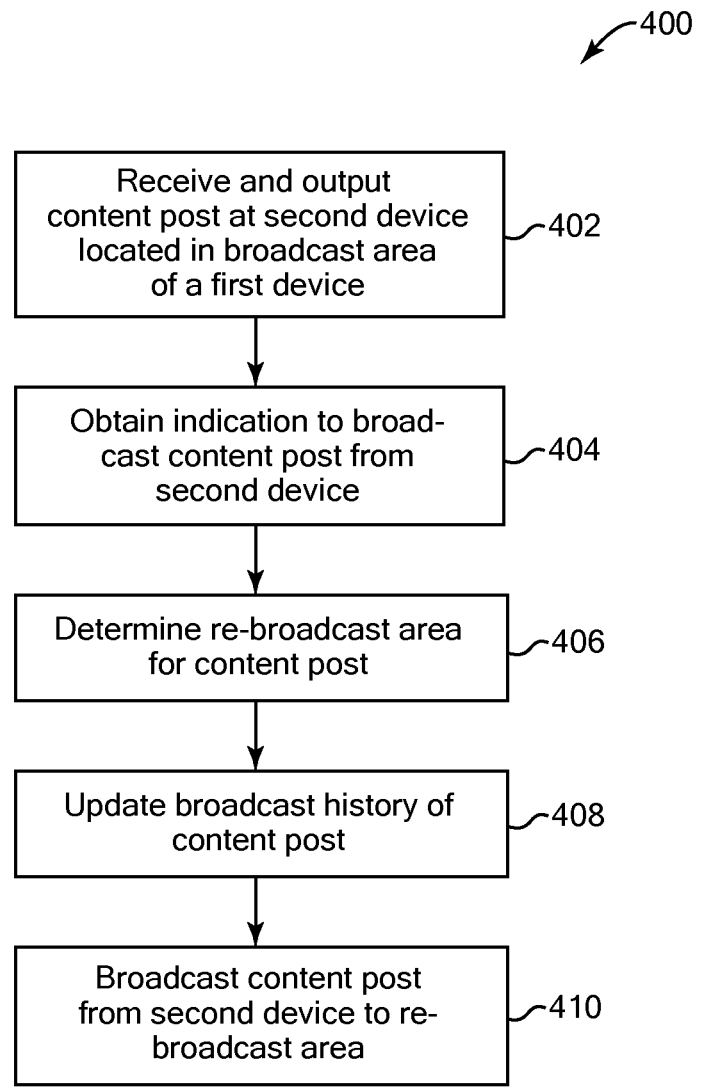
FIG. 4 is a flow diagram illustrating an example method to broadcast content data to a re-broadcast area, according to some implementations.

FIG. 4 is a flow diagram illustrating another example method 400 to broadcast content data to a broadcast area, according to some implementations. In this example method, the broadcast area can be a re-broadcast area, e.g., a broadcast area to which a device broadcasts a content post, where the content post was received by the device in a broadcast caused from a different device.

In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or client devices can perform different blocks or other parts of the method 400. In some examples, a second device (or re-broadcasting device) is described as performing blocks of method 400, where the second device can be a different device than the first device described for FIG. 3, for example. Some implementations can have one or more blocks of method 400 performed by one or more other devices (e.g., other client devices or server devices) that can send results or data to the second device.

In block 402, a second device receives and outputs a content post, where the second device is located in a broadcast area of the content post sent by a first (sending) device. For example, in some cases the received content post can be originated and provided from the first device and the broadcast area can be an initial broadcast area of the content post as determined by first device, as described above with respect to FIG. 3. In some cases, the received content post can be a content post that was previously received at the first device from a different device and was broadcast (e.g., re-broadcast) from the first device to the second device.

The content post can be received at the second device via any of various communication techniques. For example, wireless and/or wired networks can provide the content post to the second device, e.g., cell phone networks, wireless networking, Ethernet, etc. In some examples, the content post can be received from an intermediate server, e.g., via wireless communication or wired communication. In some examples, the content post can be received directly from the first device, e.g., via wireless communication or wired communication. In some implementations, content posts can be received using other techniques, such as receiving a stored content post that was previously broadcast and associated with a particular location, such that when the second device is moved to the location (or to a location within a threshold distance of the location), the second device is sent the content post, e.g., from a server. In another example, the second user can connect to a computer at particular location with the second device and the second device can instantly receive a broadcast of one or more content posts that have been previously broadcast by other devices to that location and stored for later reception by devices like the second device.

The received content post (e.g., content data of the content post) can be output by the second device in block 402, e.g., displayed by the second device or otherwise output by the second device or a connected device. For example, the content data of the content post can be displayed on a display screen or other display device of the second device, and/or can be output as audio from one or more speakers of the second device. In some implementations, e.g., if the content post was received over a peer-to-peer network, the second device determines to output the content post in response to the second device being located in the broadcast area intended for the content post, e.g., as indicated in data accompanying the content post. Some implementations can provide output from the second device based on additional data of the content post in addition to the content data. For example, a map can be displayed and a geographical location of the first device can be displayed on the map based on location data included in the content post that indicates the location of the first device.

In block 404, an indication is obtained to broadcast the content post from the second device. For example, the broadcast can be considered a re-broadcast since the second device is broadcasting a content post that it received in a broadcast from a different device. In some implementations, the indication can be similar to the indication described above for block 304, e.g., an indication received from a user of the second device (e.g., based on user input to the second device or other device) or from other sources to broadcast the content post, e.g., a received command.

In some implementations, the indication to broadcast in block 404 can be considered to be an approval or positive rating by the user of the second device, where the approval approves of the content data in the content post. The indication to broadcast can also be considered an indication of the user's desire to share the content post with other users. Some implementations can allow the user to indicate a positive (or negative) rating for the content data and/or provide user comments for the content data, and some of these implementations may not allow sharing or re-broadcast of the content post. For example, the rating and/or comments of the user can be sent to a server or other device to collect user rating and comment data from devices that received and displayed the content post. Some such implementations may not allow the broadcast area to spread beyond an initial broadcast area.

In some implementations, the indication to broadcast in block 404 can be derived from other criteria different than or in addition to user input. For example, stored user preferences can be examined which, e.g., have been previously designated by the user of the second device. Such user preferences may, for example, indicate whether or not the second device should automatically re-broadcast the received content post without requiring human intervention such as user input. In some examples, the user preferences can indicate to automatically re-broadcast a content post that is received in particular geographic locations (or types of geographic locations) of the second device, received from particular geographic locations (or types of geographic locations) of the first device and/or the originating device, and/or received from particular users. Other conditions can include the received post including particular content data (e.g., particular topics, types of content data, and/or content data having other characteristics), etc. If indicated condition(s) are met, the user post is designated in method 400 to qualify for broadcast. Similarly, other stored user data related to the second user can be examined to assist determining whether the received content posts should be automatically broadcast. For example, the user data can describe a history of previous broadcasts (original and/or re-broadcasts) in the past indicating that one or more previous broadcasts by the second user were sent in similar geographical regions and/or included content data that was similar to the current content post (e.g., in topics, type, etc.), such that the current content post qualifies for broadcast. Some conditions can be based on other user data, e.g., a history of previous activities of the second user, calendar data of the second user, social data of the second user (e.g., ratings, comments, shares, etc. of content by the second user as stored by a social networking service or other network services), etc., which can be used to indicate whether the current content post should be broadcast.

In block 406, a re-broadcast area is determined for the content post. The re-broadcast area can be a geographical area in which the content post can be received and/or output by receiving devices located in that area. In some implementations, the re-broadcast area can be associated with the user of the second device and/or based on previous content posts that have been received by the second device from broadcast(s) made by different devices (such as the first device as described in blocks 402 and 404). In some implementations, the re-broadcast area can be different than an initial broadcast area used to initially broadcast a content post. Some implementations can use a re-broadcast area that is the same as an initial broadcast area for the received content post.

In some implementations, the re-broadcast area can be determined at least in part based on a stored broadcast history of one or more previous content posts related to the user of the second device. For example, the re-broadcast area can be based on a user broadcast history of one or more previous content posts sent by the user of the second device (and/or sent by the second device). In some examples, the user broadcast history indicates one or more previous posts that the user of the second device has previously initially broadcast (originated) to a geographical area at or close to (e.g., within a predefined distance of) the current location of the second device. Some examples of determining a re-broadcast area based on examples of a stored broadcast history are described below with respect to FIG. 6. A stored broadcast history can be stored on the second device and/or can be stored remotely, e.g., a server or remote storage device.

In some implementations, unlike some initial broadcast area determinations described above for FIG. 3, a re-broadcast area is not determined based on a data broadcast history (e.g., topic broadcast history) for one or more previous content posts that have been broadcast with the same or similar content data as the content post. In some examples, a re-broadcast area not based on data broadcast history can be smaller in size than an initial broadcast area that is based on such data broadcast history. In some implementations, the re-broadcast area can be based at least in part on a data broadcast history, e.g., similarly as described for the initial broadcast area.

In some implementations, the re-broadcast area can be based on additional factors, e.g., characteristics of the user of the second device, user preferences, characteristics of the second device, characteristics of the content data, characteristics of the geographical area surrounding the second device, characteristics of a time of day, date, or event, privacy characteristic of the content post, or other condition related to the second device, the user of the second device, the content post, and/or the geographical area, one or more of which can be similar to such characteristics described above with reference to FIG. 3.

In some implementations, the determination of the re-broadcast area can include modifying the re-broadcast area. For example, a re-broadcast area based on a stored broadcast history can be scaled based on distance of the current location of the second device to an originating location of previous content posts, a geographical extent of broadcast of previous content posts, and/or other factors.

In block 408, a stored current broadcast history associated with the current content post is updated. The current broadcast history can include one or more geographical locations at which the current content post has been broadcast (e.g., initially broadcast and re-broadcast) by one or more devices. In some implementations, the current broadcast history can be included as data in the current content post (e.g., securely transmitted), and/or can be stored by one or more devices (e.g., a server system accessible by broadcasting devices). For example, the current broadcast history associated with the current content post can be updated with the geographical location (e.g., geographical coordinates or other location data) of the second device, e.g., as a location at which the content post was re-broadcast. In some implementations, the update can also include an indication of the location of the first device and that the second device received the content post from the first device, thus indicating the direction of propagation. For example, the location of the second device can be added as a node in a directed graph associated with the current content post, indicating that the content post was received at the location of the second device from the location of the first device, and was re-broadcast by the second device.

In some implementations, the current broadcast history that is updated in block 408 is provided in one or more stored post histories. For example, a post history can be associated with the user (or device) who initiated the content post, and the method can update a user broadcast history of the current content post in the post history. In some implementations, user broadcast histories can be stored on a server system. In some implementations, one or more related data broadcast histories can also or alternatively be updated. For example, a topic associated with (e.g., included in) the current content post may be associated with a list of previous content posts that included that topic, where each previous post has an associated broadcast history. The location of the second device (and, in some cases, the location of the first device broadcasting the content post received by the second device) can be added to the broadcast history of the current content post in the list of posts for the topic. For example, the post history for topics can be stored on a server, such that the second device indicates to the server to add its location to the individual broadcast histories associated with indicated topics included in the content post. In some implementations, the second device can store and maintain a broadcast history for topics and/or other types of data, can update the broadcast history in accessible storage. Some implementations can store broadcast histories on other devices, e.g., client devices.

Some implementations can store additional data related to the user of the second device in association with the current content post. For example, ratings, comments, or other user data provided by the second user can be stored in a broadcast history or other history associated with the current content post.

In some implementations, one or more locations in the broadcast history of the current content post can be removed in block 408 if appropriate. For example, one or more locations may be removed if the current broadcast history has become too complex, e.g., has a greater number of locations than a threshold number. In one example using a directed graph to indicate the broadcast history, the update to the current broadcast history may add a node (or other data) to the directed graph, which may cause the directed graph to become complex, e.g., require more than a threshold amount of storage space, require more processing time or resources, etc. If it is determined that one or more locations should be removed, one or more locations associated with an earlier broadcast can be removed. In some implementations, this removal can maintain the same broadcast coverage as before the removal. For example, the directed graph can be refactored to remove one or more location nodes to consolidate locations that are within a threshold distance of each other, e.g., find an average location between two or more previous re-broadcast locations and remove the previous re-broadcast locations from the graph while adding the averaged location to the graph. Alternatively, one of the previous locations can be kept in the graph and the other location removed. Locations can be removed from the current broadcast history in various other ways in other implementations, e.g., based on distance from the location where the post was initiated, based on one or more characteristics of the user or the device performing the broadcast, etc.

In some implementations, the updates to the current broadcast history of the current content post can be immediately stored and used, such that any new content posts created by the user who originated the current content post may incorporate the updates into the determination of the initial broadcast area of the new content post. Some implementations, e.g., for performance reasons, can limit the use of new updates for periods of time or until broadcasts and/or updates are complete for the current content post. For example, the method can wait until the current content post has reached a limit to re-broadcasting, then allow the (now complete) updates to the broadcast history to be used in determination of new initial broadcast areas for new content posts.

In block 410, the current content post is broadcast from the second device to the re-broadcast area determined in block 406. In some examples, locations in the initial broadcast area can be excluded from the broadcast, e.g., as locations which previously received the current content post in the initial broadcast. Some implementations can also exclude locations included in one or more previous re-broadcasts of the current content post. The current content post can be sent as one or more packets or other structures of data including the content data and other data, similarly as described above for block 308. The broadcast of the current content post to the broadcast area can be implemented in any of several ways, which can be similar to the examples described above for block 308.

To exclude broadcasting the current content post to the initial broadcast area, the method can determine the initial broadcast area, e.g., based on data received in (or in association with) the current content post. For example, locations in the initial broadcast area may have already received the content post sent by the first device, or sent by another device that originated the content post previous to the first device. In some implementations, the method can find the locations or areas in the determined re-broadcast area that match locations or areas in the initial broadcast area, and remove those locations or areas from the re-broadcast area before broadcasting the content post to the re-broadcast area. In other implementations, the re-broadcast area can retain any locations from the initial broadcast area can broadcast to those locations regardless of whether they have previously received the content post. For example, receiving devices can check whether they have received a particular content post previously and can ignore repeated received content posts. In some implementations, the broadcast of block 410 can similarly exclude other locations in broadcast areas besides the initial broadcast area, which, for example, previously received the current content post in other broadcasts besides the initial broadcast.

Figure 5:
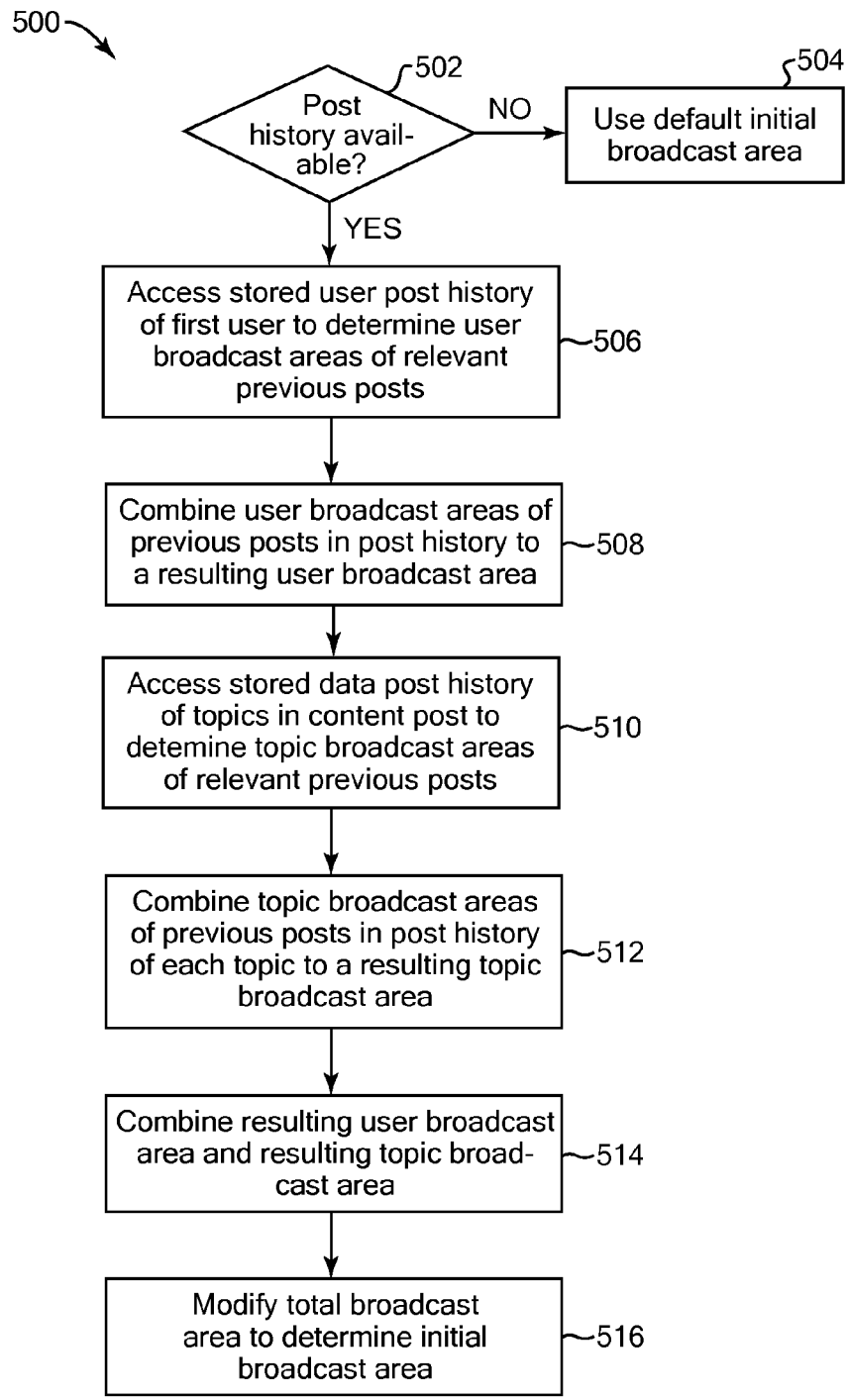
FIG. 5 is a flow diagram illustrating an example method to determine an initial broadcast area for a content post as in FIG. 3, according to some implementations.

FIG. 5 is a flow diagram illustrating an example method 500 to determine an initial broadcast area for a content post as in block 304 of FIG. 3, according to some implementations. For example, method 500 can be performed by a first device as described for FIG. 3. In some implementations, method 500 can determine an initial broadcast area for a content post after receiving an indication to broadcast the content post as shown in FIG. 3. Some implementations can perform some or all of method 500 prior to receiving an indication to broadcast a content post, e.g., as pre-processing to have at least a portion of an initial broadcast area determined for future broadcast of one or more posts by the user. For example, an initial broadcast area can be automatically determined based on a user broadcast history from a similar geographical location as a current geographical location of the first device and/or current post.

In block 502, it is determined whether there is a history of posts available. For example, in some implementations, the first device can check whether the first user of the first device, or the first device itself, has an associated user broadcast history for one or more previous posts that were initially broadcast from a location similar to (e.g., near to) the location of the current content post (e.g., which is typically the current location of the first device). A user broadcast history may have been stored and/or updated in response to the first user initially broadcasting one or more previous content posts.

In some implementations, the method can also or alternatively determine whether any content data in the current content post is associated with a corresponding data broadcast history. In some examples, the content data can include one or more topics, as described below. For example, a particular set of topics may be maintained by the first device, or by a server that is in communication with multiple devices. Each of the topics in the particular set of topics can be associated with an individual topic broadcast history. For example, each topic can be associated with a group of previous posts that include that topic and were previously broadcast. Each previous post can be associated with a broadcast history indicating the geographic locations at which the previous post was broadcast (e.g., initially broadcast and/or re-broadcast).

If no broadcast history of posts is available for the current content post, block 504 can be performed in some implementations. For example, there may be no previous content posts that were broadcast by the first user near to the current location of the first device. In block 504, a default initial broadcast area can be assigned to the content post. A default initial broadcast area can be an area having a standard size and shape, e.g., a circle or other shaped area centered on the current location of the first device and having a predefined radius or area, e.g., 1 mile (or 5 miles, etc.). In some implementations, one of multiple possible default initial broadcast areas can be selected, e.g., by a user, or automatically and dynamically determined based on one or more predefined conditions such as time of day, type of content data, number of devices detected in the surrounding geographic area (e.g., as determined by accessing current locations of the devices, e.g., as received by a server), a type of event currently occurring (e.g., if known from user calendar data accessible by the first device), etc. In some implementations, the default initial broadcast area can be modified similarly as described below in block 516 for the total broadcast area. In some implementations, the method can then return to method 300 of FIG. 3.

Block 506 can be performed if a broadcast history of posts is available in block 502. In block 506, the method accesses a stored post history of the first user to determine a user-related broadcast area for each relevant previous post. The post history of the first user can store each previous post that was initially broadcast as instructed by the first user (or, in some implementations, each previous post that was initially broadcast by the first device). The method examines the post history for relevant previous posts. In some examples, a relevant previous post can be a previous post that was initially broadcast by the first user at a similar location to the current location of the first device, e.g., at a location matching the location of the current content post. For example, a previous post can be considered relevant if it was initially broadcast at a similar location to (e.g., within a threshold distance of) the current location of the first device. In some implementations, location matches can be determined in other ways to determine relevance of previous posts. For example, a match can be defined as a current location at the same commercial establishment as a prior post location, a current location within a threshold distance of a beacon or wireless transmitter used by a previous post, a current location at similar GPS coordinates as a previous post, a current location at the same geographical feature as a previous post (e.g., mountain top), etc.

Each previous post stored in the post history can be associated with an individual broadcast history. To determine a user broadcast area for each relevant previous post, the method accesses an individual broadcast history of each relevant previous post. The individual broadcast history indicates one or more locations at which the associated previous post was received by one or more receiving devices and, for example, broadcast by the receiving devices to re-broadcast areas. The method can determine the total geographic broadcast area or footprint covered by each relevant previous post by examining these locations, and this geographic area (e.g., an area derived from these locations) can be considered the user broadcast area for that relevant previous post. Some examples of determining a user broadcast area are described below with reference to FIGS. 7 and 8.

In block 508, the user broadcast areas of the relevant previous posts of the first user's post history are combined to determine a resulting user broadcast area. For example, the method can determine the user broadcast area for each relevant previous content post in block 506, and can combine these user broadcast areas into a single resulting user broadcast area. The combining can take a number of forms in various implementations. For example, the user broadcast areas can be overlapped and joined such that the resulting user broadcast area includes all of the broadcast locations included in the histories of the relevant previous posts. Some implementations can average the location and magnitude of the user broadcast areas together to determine (e.g., normalize) the resulting user broadcast area. The resulting user broadcast area can additionally or alternatively be based on prior posting success, e.g., the area received by prior broadcast posts from the user, where large areas cause a higher scaling or larger shape of the resulting broadcast area. Some implementations can allow user payments to increase initial broadcast area (and/or re-broadcast areas) and thus increase potential audience. For example, the user can be given an option to pay money (or other currency having monetary or exchange value) to increase the initial broadcast area for posts from that user (e.g., double the initial broadcast area of the next N posts).

In some implementations, overlapping areas of the user broadcast areas can be assigned more "emphasis" in the initial broadcast area (and/or re-broadcast areas described below), causing a greater number of receiving devices to receive the current post, and/or causing other increased visibility, in the emphasized areas. For example, in some implementations using such emphasis, there can be imposed a limit (maximum) as to the number of devices in the initial broadcast area (or in each designated portion thereof) that are allowed to receive and output the current post. Only this number of devices receives the post, even if there are more devices that qualify to receive the post (e.g., are located in the appropriate area). For example, the devices allowed to receive the current post can be randomly determined within the initial broadcast area, and/or can be determined based on other criteria, e.g., having similarity in one or more characteristics to the current post (e.g., a user who has had previous contact with the first user, having a stored preference for the user or topic(s) in the current post, etc.). In some implementations, this limit can be increased in one or more particular portions of the resulting user broadcast area where the constituent user broadcast areas overlap, e.g., thus providing a given content post greater penetration in those overlapping areas. In one example, 6 out of 10 devices in the area may receive the post in an emphasized overlapping portion of the initial broadcast area, compared to 3 out of 10 devices receiving the post in non-overlapping or un-emphasized portions of the initial broadcast area. In some implementations, other types of visibility can be increased in emphasized areas of the initial broadcast area. For example, posts received in such overlapping areas can be assigned higher weight or importance to receiving devices, and/or can be allowed to have larger re-broadcast areas if the posts are re-broadcast from the overlapping areas.

Some implementations can weight or scale one or more of the user broadcast areas differently than one or more other user broadcast areas in the combination. For example, user broadcast areas based on older posts (e.g., originated further back in time from the current time) can be weighted lower or scaled to be smaller areas such that they contribute less area to the resulting user broadcast area than user broadcast areas based on newer posts. In another example, user broadcast areas related to previous posts that were initially broadcast from a location closer to the location of the current post can be scaled higher than user broadcast areas related to previous posts that were initially broadcast from a location further away from the location of the current post.

Some implementations can use only a portion of one or more of the resulting user broadcast areas in the determination of the initial broadcast area. For example, if the first device is currently located outside a threshold distance of the (approximate) location at which the relevant previous posts were originated, then only particular portions of the resulting user broadcast areas can be included in the initial broadcast area. In one example, if the current device location is to the west of the originating location of the previous posts, then only a western portion of the user broadcast areas of those previous posts can be used for determination of the initial broadcast area. In some implementations, the magnitude, shape, and/or extent of the portion can be based on a distance between the current device location and the originating location of previous posts.

In some implementations, previous posts of the first user which were not broadcast at a similar location to the location of the current content post can be considered at least partially relevant and can be included in the determination of the resulting user broadcast area. For example, the size of user broadcast areas (or initial broadcast areas) determined for posts sent in other geographic regions can be used to influence the initial broadcast area for the current post's location. In one example, if it is found that the user broadcast areas for previous posts in a different region all tended to be greater than a particular magnitude in area, then the initial broadcast area for the current location can be designated to have at least that particular magnitude, e.g., a lower limit in area magnitude. In another example, multiple previous user broadcast areas determined for other geographic regions can be averaged (or otherwise combined) to determine an average user broadcast area, which can influence the determination of a magnitude of the initial broadcast area of the current content post. For example, the average user broadcast area can determine a minimum area magnitude (e.g., and not a specific spatial configuration or spatial pattern) of the initial broadcast area. In some examples, using previous posts from other regions (even far away) to influence the initial broadcast area of the current post can allow users who previously broadcast posts that were popular (e.g., re-broadcast a greater number of times) to have more initial reach with their new posts than users who broadcasted posts that were less popular. In another example, some implementations may only be able to examine related previous posts originating from locations far from the location of the current content post, and can determine an initial broadcast area that has a regular shape (e.g., a circle centered on the current location of the first device), where that regular shape has an area magnitude based on the user broadcast areas of the previous posts.

In block 510, a stored data post history, related to content data in the current content post, may be accessed to determine a broadcast area for each relevant previous post having at least a portion of its content data similar to content data in the current post, e.g., thus having relevant content data. The relevant previous posts that have similar content data to the current post may have been broadcast previously by any user or device, and not just the first user or first device. For example, relevant previous posts may be considered from previous posts that were initially broadcast (and/or re-broadcast) at a similar location to the location of the current content post (e.g., the current location of the first device), such as a matching location as described above. In some implementations, relevant previous posts may have been broadcast in a region that includes the location of the current content post and/or first device.

The content data can include one or more of a variety of types. In some examples described herein, the content data includes one or more topics, where a topic post history allows access to relevant previously-broadcast posts having topics similar to current topics in the current post. In some implementations, a topic can be defined by one or more words (e.g., a word or a phrase). In some implementations, a topic can include symbols, special characters (e.g., emoji), etc.

Topics from previous posts in the stored topic post history can be examined and compared to one or more current topics included in the current content post to try to find matches. For example, a topic in a previous post of the topic post history can be similar to (including the same as) a current topic in the current post based on having one or more words with a same or similar spelling, having a threshold amount of characters the same, etc. Such a similarity can be considered a match between a topic in a previous post and a current topic in the current post.

In some implementations, a topic can have a same or similar semantic meaning to a current topic in the current post to be considered a topic match. For example, proper names and/or generic terms in previous posts can be compared to such names and terms in the current post. In one example, a word "stadium" can be considered to be a match to the word "ballpark." For example, a thesaurus or other stored or online reference can be consulted to find synonyms of a word or phrase in the current post and/or in previous posts of a stored post history of topics, and matches between topics and synonyms can be determined. In some implementations, stored or online map information can be examined to determine or extract known proper names of features in a geographic region of the first device, and these proper names can be considered topics for use in determining matches. Other techniques can also be used to determine same or similar semantic meanings in topics, such as referring to databases, knowledge bases having predefined links between different words and between words and categories, etc. In another example, a topic of the current post or a previous post may have multiple meanings. In some implementations, a particular meaning for the topic can be selected based on automatic examination of context, of other topics in the content data of the current post, of characteristics of the current post or location, etc.

Some implementations can provide a different list of topics for each of a plurality of defined geographical regions. For example, if the first device is located in a particular region, then the list of topics associated with that region can be consulted by the method to look for matches to the topics of the content data in the current post. The different lists of topics can be stored and maintained, for example, by one or more server systems, and/or by client devices. Some implementations can rank topics based on popularity, as described in greater detail below.

In some implementations, other types of content data can be compared to content data of previous posts, instead of or in addition to topics as described above. For example, the types of content data can include images, video data (e.g., video frames or sequences), audio data, and/or other types of content. Some implementations can compare characteristics of the current content post to previous posts, such as time-related characteristics, e.g., included in metadata of the content data. For example, time of initial broadcast can be related to previous posts that were broadcast within a particular threshold time period before the current post, and the broadcast areas of these previous posts can be included in the determination of the initial broadcast area for the current post.

For example, in some implementations, topics can be determined from non-text content data included in the current content post, e.g., images, video data, audio data, pictorial data, etc. For example, one or more image recognition techniques can be employed by the method on image content data in the current content post to recognize image features such as faces, objects, landscape features, landmarks, etc. Some image recognition techniques can determine labels for identified features, where the labels can be words or phrases, e.g., the names of persons or objects, categories, brand names, etc. Some images may include metadata including such labels associated with one or more features depicted in that image. Such labels can be treated as topics and can be compared to topics of previous posts in a stored topic post history. Similarly, topics can be extracted from audio data in the current content post using one or more voice recognition techniques, and can be compared to previous posts in the stored topic post history.

A stored post history can be accessed in block 510 for matched topics (or other type of matched related content data) to determine a topic broadcast area for each relevant previous post in the post history, where the topic broadcast area can be the total geographic area (footprint) covered by previous broadcast of the associated previous post. The post history of a particular topic can store one or more previous posts that were initially broadcast and included that topic. The method examines the post history for relevant previous posts, e.g., having a topic matched to a topic associated with (e.g., included in) the current content post. In some examples, a relevant previous post can be a previous post having a matched topic and which was initially broadcast at a location similar to the location of broadcast of the current content post. For example, a topic-matching previous post can be considered relevant if it was initially broadcast at a similar location to (e.g., within a threshold distance of) the current location of the first device. In some implementations, a topic-matching previous post can be considered relevant if it was initially broadcast in the same geographic region in which the first device is currently located.

Similarly, as with the user post history of the first user, each previous post stored in the topic post history can be associated with an individual broadcast history. To determine a topic broadcast area for each relevant previous post, the method accesses an individual broadcast history of each relevant previous post. The individual broadcast history indicates one or more locations at which the associated previous post was received by one or more receiving devices and, for example, broadcast by the receiving devices to re-broadcast areas. For example, the set of receiving devices receiving previous topic posts are typically not the same set of receiving devices receiving previous user posts described for block 506. The method can determine the total geographic area (footprint) covered by each relevant previous topic post by examining these locations, and this geographic area (e.g., an area derived from these locations) can be considered the topic broadcast area for that relevant previous post. Some examples of determining a topic broadcast area are described below with reference to FIGS. 9 and 10.

In block 512, the topic broadcast areas of relevant previous content posts in the topic post history may be combined (or otherwise used) to determine a resulting topic broadcast area. For example, the method can determine the topic broadcast area for each previous content post having content data (e.g., topic) matched to content data in the current content post as described above for block 508, and can combine the topic broadcast areas into a single resulting topic broadcast area that represents a broadcast area for the topics included in the content data of the current content post. The combining can take a number of forms in various implementations. For example, the topic broadcast area of each relevant previous post having a matched topic can be overlapped and/or joined such that the resulting broadcast area includes all of the broadcast locations included in the histories of the relevant previous posts. In some implementations, the topic broadcast areas of the relevant previous posts can be averaged in location and in magnitude to determine the resulting topic broadcast area. The topic broadcast areas can contribute to the resulting topic broadcast area in other ways, e.g., by emphasizing overlapping areas of the topic broadcast areas, weighting or scaling topic broadcast areas, using a portion of topic broadcast areas, etc., similarly as described above for block 508.

For example, some implementations can weight or scale one or more of the topic broadcast areas differently than one or more other topic broadcast areas in the combination. For example, topic broadcast areas based on older topic posts can be weighted lower or scaled to be a smaller area such that they contribute less area to the resulting topic broadcast area than topic broadcast areas based on newer or more recent topic posts. In another example, topic broadcast areas related to more popular topics (e.g., topics that have been included in a greater number of previous posts, e.g., as tracked by a server system) can be scaled to a greater area than topic broadcast areas related to less popular topics.

In some implementations, a topic broadcast area can be determined and stored for each particular topic in a list of available topics, e.g., by the first device and/or a server system. Relevant topic broadcast areas of these stored broadcast areas can be retrieved and used in the determination of an initial broadcast area as described herein. Stored topic broadcast areas can be updated or re-determined in response to one or more new relevant content topic posts being broadcast at a location similar to (e.g., within a threshold distance of) the location of the previous topic posts. For example, topic broadcast areas stored on a server can be updated based on new relevant topic posts broadcast in a geographic region associated with the topic broadcast areas.

In block 514, the resulting user broadcast area of block 508 and the resulting topic broadcast area of block 512 are combined (or otherwise used) to determine a total broadcast area. In some implementations, these resulting broadcast areas can be combined similarly as the broadcast areas determined for previous posts as described above for blocks 508 and/or 512. For example, the resulting broadcast areas can be overlaid and summed, and/or joined (e.g., with duplicative locations removed) such that the total broadcast area includes all of the resulting broadcast areas. Some implementations can include additional and/or different broadcast areas in the combination to determine the total broadcast area. The resulting broadcast areas can contribute to the total topic broadcast areas in other ways, e.g., averaged, etc.

In some implementations, one or more of the resulting broadcast areas used in block 514 can be weighted, scaled, or otherwise adjusted for use in the combining that results in the total broadcast area of block 514. For example, some implementations can scale the resulting user broadcast area of block 508 relative to the resulting topic broadcast area of block 512, e.g., to emphasize one type of resulting broadcast area in the total broadcast area. For example, some implementations can emphasize a topic-based initial broadcast area so that the resulting topic broadcast area is scaled or weighted higher than the resulting user broadcast area in the total broadcast area. In some implementations, the weighting of the resulting broadcast areas can be based on a ratio between the resulting user broadcast area and the resulting topic broadcast area. For example, 20% of the total broadcast area may be based on the resulting user broadcast area and 80% may be based on the resulting topic broadcast area.

Some implementations can determine the adjustment and contributions (e.g., using weighting, scaling, ratios, etc.) of one or more types of resulting broadcast areas based on a variety of factors. For example, one or more characteristics of the resulting broadcast areas can be examined. In one example, e.g., current popularity of the posts of a particular type (e.g., number of re-broadcasts as tracked by one or more devices) can determine contributions. In one example, if the previous posts of the topics in the current post were re-broadcast many more times than the previous posts of the first user, then the resulting topic broadcast area can be given more weight than the resulting user broadcast area. For example, the ratio or percentages of contributions from the broadcast history of the user and the broadcast history of the topics can be determined based on a number of broadcasts of the previous content posts sent by the first user, and based on a number of re-broadcasts of previous content posts including at least one of the topics of the current content post. Thus, the contributions can be dynamically determined based on current conditions and broadcast characteristics of posts.

Other characteristics can influence the adjustment and contributions, such as recency of broadcasts (e.g., more recent broadcasts are given more weight), characteristics of the particular geographic region (e.g., certain topics are determined to be relevant to an event or region), etc. Some implementations can track how far posts propagate through a geographic region based on included topics, the user broadcasting, and/or other characteristics, and can determine the adjustment and contributions based on current trends that are popular in the region (e.g., as based on how far posts propagate across geographic regions).

In block 516, the total broadcast area determined in block 514 may be modified to determine the initial broadcast area for the current content post. For example, in some implementations, an initial broadcast area can be a scaled down version of the total broadcast area, e.g., a smaller area than the total broadcast area. Some implementations can modify the total broadcast area dynamically based on one or more characteristics of the user, the first device, the geographical region, and/or the current content post. For example, if it is determined that a particular topic in the current content post is popular (e.g., over a threshold number of content posts that the particular topic has been included, within a most recent threshold time period), then the total broadcast area can be scaled higher, e.g., based on a magnitude of the popularity. In some implementations, the total broadcast area can be scaled based on the popularity relative to a threshold. Some implementations can scale the broadcast area based on characteristics of the post as described above for block 518.

In some implementations, one or more servers or other devices can maintain and update a stored and selected list of popular topics and/or other selected topics for each region. In one example, a server can rank (or otherwise prioritize) topics based on popularity, e.g., current popularity. In some implementations, popularity can be based at least in part on various factors that can include one or more of: the number of broadcast content posts in which the topic has been included, the number of initial broadcasts of posts that include the topic, the number of re-broadcasts of posts that include the topic, the time of broadcast (e.g., within a predefined time range, recent posts having more weight, etc.), the broadcasts being within a predefined geographic area of a region, etc. Different popularity weights can be assigned to different previous posts in some implementations, e.g., based on the above factors, and/or based on user influence, e.g., posts sent by more influential users (as determined by geographical extent and/or number of previous broadcasts, etc.) can be assigned higher weights in determining popularity of topics included in those posts. In some implementations, topics can be ranked separately for different geographical regions. For example, a list of top ten ranking topics can be determined for a first region and a different list determined for a second region based on the particular topics broadcast in each region. In some implementations, the server can only check a predefined number of top ranking topics for matches to topics in the current content post and/or in the current geographical region, e.g., in block 510. In another example, a list of the 10 (or 100, etc.) most popular topics can be maintained.

If a topic in the current content post matches a popular topic, the initial broadcast area of that current content post can be scaled higher in magnitude and/or shaped to be greater, or the current post can be otherwise increased in broadcast effectiveness. For example, the initial broadcast area of the current content post (and/or re-broadcast areas as described below) can be scaled higher and/or changed in shape (e.g., in block 516) to extend to particular geographic areas in the geographic region that are determined to be popular with that topic, e.g., based on broadcast history.

In some implementations, the maintained and ranked selected lists of topics can include topics selected based on other criteria. For example, topics that have been designated as important or relevant to a particular current event taking place in the area of the broadcast and/or the geographical region of the broadcast can be maintained. In one example for a marathon event, topics of "running", "race," "first place," etc., can be maintained as a ranked list of topics for the event in a particular geographic region, such that topics in content posts that match these selected topics can provide a greater weight or scale to the associated topic broadcast areas compared to non-matching topics.

Some implementations can determine or influence an initial broadcast area based on topic broadcast history and its association with particular geographic features in a geographical area, e.g., roads, buildings, stadiums, businesses, parks, rivers, lakes, mountains, hiking or running trails, traffic patterns (e.g., including time of day), event locations, etc. For example, a device (e.g., client or server) can monitor for particular topics in content posts (e.g., with permission from participating users), and can look for patterns in locations of broadcasts of topics that may coincide with geographic features present in the broadcast areas. The device can apply similar location patterns to the broadcast areas of new content posts, e.g., relative to the same specific geographic features in that area and/or relative to similar geographic features in other areas. In one example, the method may determine that posts that include topics related to foot racing events, such as "marathon" and "5K," tend to be broadcast and re-broadcast mostly near particular roads in a region and at few locations elsewhere. If a current content post is broadcast in a location near those roads, the method can determine to bias the shape of its initial broadcast area (and/or re-broadcast areas, described below) to surround those particular roads and to taper off further from the roads.

In some implementations, for content posts that include matched topics and are broadcast in different geographic areas, the method can intelligently determine to use a similarly-shaped initial broadcast area (and/or re-broadcast areas) biased to be near roads in those different geographic areas. For example, a system can maintain a stored list of particular topics and/or topic categories which are associated with particular shapes or patterns of broadcast areas relative to particular types of geographic features. In some examples, the system can reference stored map information to find similar types of geographical features in different areas.

In some implementations, the method can determine how much to modify the re-broadcast area based on frequency of broadcasts. For example, a server system can track the number of posts being sent or received in a particular geographic region (e.g., per time unit), and if this number goes too high (e.g., over a threshold number or frequency), then the server can inform the first device that the initial broadcast area for posts should be scaled down. Similarly, if the number of broadcast posts goes too low (e.g., under a threshold number or frequency), then the initial broadcast area can be scaled higher to encourage more post propagation over geographic areas. For example, a rural area may have comparatively fewer posters than an urban area in a geographical area of a certain size, and so can have initial broadcast areas scaled higher, e.g., to allow a user to see a given amount of post traffic in a received stream/feed.

Some implementations can include using "fuzzy matching" to perform matches between current and previously-posted topics, and/or to match posts and/or post topics to events, activities, etc. For example, fuzzy matching can match previous posts that were broadcast on particular dates to particular events which may not fall on the same date every year. In some examples, if there is a large spike in the number of posts broadcast on Nov. 21, 2013 and Nov. 20, 2014 having topics related to "turkey," it can be inferred that these posts relate to the same recurring event even though the posts were not broadcast on the same date. In response, the method can conclude that these posts refer to Thanksgiving Day, and the topic "turkey" can be promoted, e.g., put on a ranked list of important topics for on Thanksgiving Day of the current year (e.g., Nov. 19, 2015).

Some implementations can provide limits to the maximum size (e.g., area magnitude) and/or shape of the initial broadcast area. In some examples, a predefined maximum area magnitude can be imposed for all initial broadcast areas. Alternatively, a maximum area magnitude can be customized for each initial broadcast area, based on one or more characteristics of the user, location, device, post histories, etc. related to the current content post. Similarly, a shape of the initial broadcast area can be limited, e.g., to have a particular ratio or less between its two dimensions over a geographical area. Some implementations can limit the number of devices in the initial broadcast area (or in a re-broadcast area as described below) that are able to receive and output the current post, similarly as described above.

In some implementations, particular geographically-distant locations or areas can be included in an initial broadcast area and/or re-broadcast areas. For example, one or more geographically-distant areas can be associated with the current location, topic, user, or other characteristics of the user, first device, and/or current content post, and so the distant area(s) can be included in an initial broadcast area or re-broadcast area. In some examples, a sporting event may cause two regional teams to compete against each other, and the hometowns or home regions of these two sports teams can be considered associated or related to current post for purposes of broadcasting user posts, regardless of the distance between these home regions and/or regardless of the distance to the location of the current user post. For example, if the current post is broadcast in the stadium hosting the sporting event, that post can be broadcast to the away-team's home region, even if that region is geographically distant (e.g., via a server system). In another example, the post can be broadcast to multiple distant regions, where each region is associated with one of the competing teams or is associated with a hosting entity (person, city, corporation, etc.). Similarly, if the current post is related to a presentation by a famous person originating from a particular area, the post can be broadcast to that particular area regardless of its distance to the current location of the post.

In some implementations, user data describing user comments, ratings, approvals, etc. can be stored and accessed in stored post histories of previous posts, e.g., in user post histories and/or data post histories. For example, users who re-broadcast previous posts may have input such user data. Some implementations can use such user data to influence the size and/or shape of the initial broadcast area. For example, positive ratings for a previous post from the first user may provide greater weight to the resulting user broadcast area that is based on that previous post. Similarly, negative ratings for previous posts can reduce the weight or size of a resulting broadcast area based on those posts.

Figure 6:
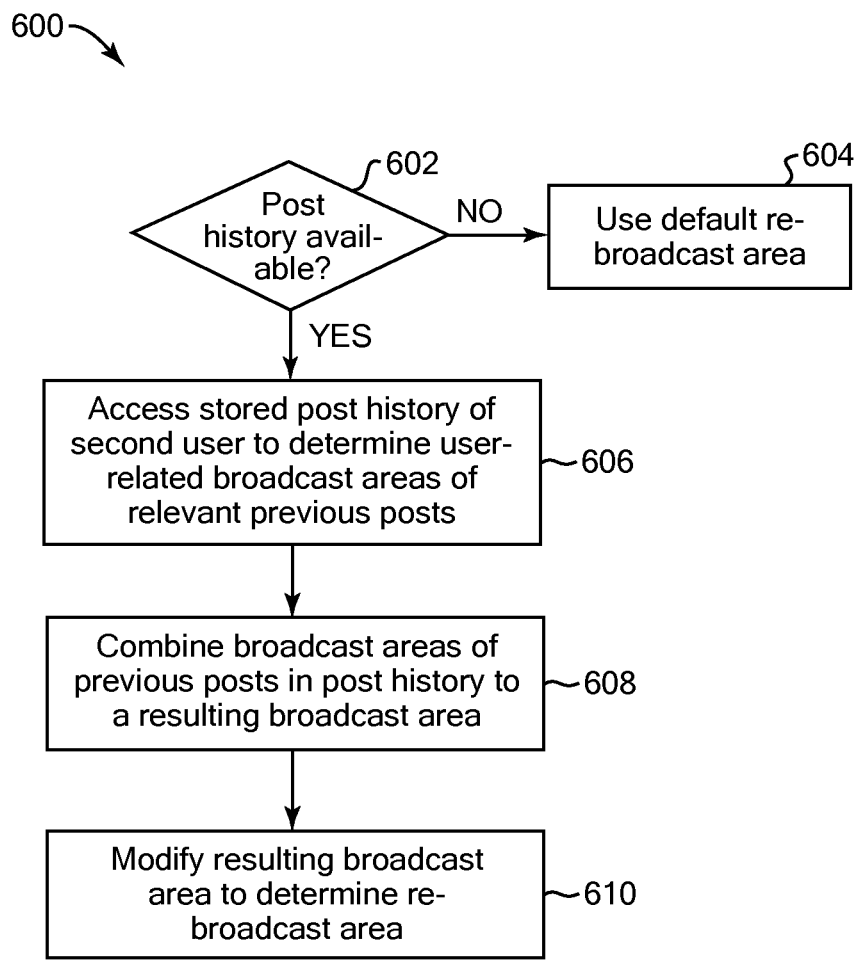
FIG. 6 is a flow diagram illustrating an example method to determine a re-broadcast area for a content post as in FIG. 4, according to some implementations.

FIG. 6 is a flow diagram illustrating an example method 600 to determine a re-broadcast area for a content post that is to be broadcast by a device as in block 404 of FIG. 4, according to some implementations. For example, method 600 can be performed by a second device as described for FIG. 4. In some implementations, method 600 can determine a re-broadcast area for a content post after receiving an indication to broadcast the content post as shown in FIG. 4. Some implementations can perform some or all of method 600 prior to receiving an indication to broadcast a content post, e.g., as pre-processing to have at least a portion of a re-broadcast area determined for future broadcast of one or more posts by the user at particular locations. For example, a re-broadcast area can be automatically determined based on a user broadcast history of previous posts from a similar geographical location as a current geographical location of the second device and/or current post.

In block 602, the method determines whether there is a history of posts available. For example, in some implementations, the second device can check whether a second user of the second device, or the second device itself, has an associated user broadcast history for one or more previous posts that were initially broadcast from a location similar to (e.g., near to or within a threshold distance of) the current location of the second device. A user broadcast history may have been stored or updated in response to the second user initially broadcasting previous content posts.

Block 604 can be performed if no broadcast history of posts is available. For example, there may be no previous content posts that were broadcast by the second user near to the current location of the second device. In block 604, a default re-broadcast area can be assigned to the content post. A default re-broadcast area can be, for example, an area having a size and shape based on predefined criteria. In some implementations, the default re-broadcast area can be determined similarly to the default initial broadcast area described with reference to block 504 of FIG. 5. Some implementations can scale the default re-broadcast area differently than the default initial broadcast area. For example, the default re-broadcast area can be smaller in size or area than a default initial broadcast area. In some implementations, the default re-broadcast area can be modified similarly as described below in block 610 for the resulting re-broadcast area. In some implementations, the method can then return to method 400 of FIG. 4.

Block 606 can be performed if a broadcast history of posts is available in block 602. In block 606, the method accesses a stored user post history of the second user to determine a user broadcast area for each relevant previous post. This block can be similar to block 506 of FIG. 5 except related to the second user instead of the first user. For example, a user post history of the second user can be accessed to determine user broadcast areas for relevant previous posts that were initially broadcast by the second user at a similar location to the location of the current content post (e.g., the current location of the second device). For example, the similar location can be a matching location as described above for block 506.

In block 608, the user broadcast areas of the relevant previous posts of the second user's post history are combined (or otherwise used) to determine a resulting broadcast area. For example, similarly to combining the broadcast areas for the first user's post history as described for block 508, the method can combine the user broadcast areas (footprints) of the previous content posts that the second user previously broadcast within a threshold distance of the current location of the second device. These user broadcast areas of previous posts can be used to determine the resulting broadcast area, e.g., in any of a number of ways similarly as described for block 508.

In block 610, the resulting broadcast area determined in block 608 may be modified to determine the re-broadcast area for the current content post. In some implementations, the re-broadcast area can be scaled in size. For example, the re-broadcast area can be scaled down in size to become a smaller version of the resulting broadcast area, e.g., a smaller area magnitude than the resulting broadcast area. Some implementations can scale the resulting broadcast area based on one or more characteristics of the second user, the second device, the geographical region, and/or the current content post. In some implementations, the broadcast area of block 610 is scaled to be smaller than the initial broadcast area determined in block 516 of FIG. 5. For example, in some implementations, re-broadcasting the content post can be provided with smaller broadcast areas than initial broadcasts to reduce the rate of propagation. In some implementations, if re-broadcast areas are larger, the propagation of posts may scale up to a large area very rapidly and there may be a very large number of content posts received at some devices.

In some implementations, the method can dynamically determine how much to modify the re-broadcast area. For example, a server system can track the number of posts being sent in a particular geographic region (e.g., per time unit), and if this number goes too high (e.g., over a threshold number or frequency), then the server can inform the second device that the re-broadcast area for posts should be scaled down. Similarly, if the number of broadcast posts goes too low (e.g., under a threshold number or frequency), then the re-broadcast area can be scaled higher to encourage more post propagation over geographic areas.

Some implementations can provide a distance limit as to how far re-broadcasted content posts can be broadcast from the location of initial broadcast of the content post. For example, a re-broadcast area can be scaled down to zero in block 610, or a very small distance, if the method 600 determines that the second device is beyond a distance limit. The distance limit can also be dynamically determined based on current post traffic and/or other factors relating to broadcast posts in the local geographic region, relating to other characteristics of the second user, first user, content data, second device, etc. For example, particular topics included in the current content post may be associated with higher broadcast limits and/or higher scaling of re-broadcast areas, while other topics may be associated with lower broadcast limits and/or lower scaling or re-broadcast areas.

Some implementations can modify the shape of the re-broadcast area based on similar factors as described for the scaling of the re-broadcast area. For example, if a particular portion of a geographic region is not receptive to particular topics as shown by topic broadcast histories and/or server tracking, then the re-broadcast area can be modified in shape to exclude or reduce broadcast distance into that region portion. In some implementations, the initial broadcast area of FIG. 5 can similarly be modified (e.g., shaped and/or scaled) as described above.

In some implementations, as shown in FIG. 6, post histories related to content data in content posts (e.g., topic broadcast history) are not used to influence the re-broadcast area determined in method 600, unlike the method 500 of FIG. 5. In other implementations, post histories related to content data can be used to influence the determined re-broadcast area, e.g., similarly as described above for FIG. 5.

In various implementations of methods 300, 400, 500, and/or 600, other or additional features can be used. For example, some implementations can provide filters on devices allowing users to filter particular content posts that meet the criteria of the filter. For example, a device may provide positive filters allowing a user to subscribe to particular desired topics included in broadcast content posts, such that content posts including the subscribed topics are output on the device and content posts not including the subscribed topics are not output on the device (and/or are not received by the device, e.g., if a server knows of the user's subscribed topics and can exclude the user's device from received non-qualifying posts). Similarly, a device may provide negative filters allowing a user to designate which topics that the user does not want output on the device. The filters can be based on other post characteristics other than topics, such as content type (images, text, etc.), the user who initially broadcast the post, regional filters (e.g., filter out posts when the device is in a particular geographic region), etc.

Some implementations can implement a reporting function or "voting" function that can influence broadcasts of new content posts. For example, users may be able to rate or vote on content posts, and posts that are similar to previous posts that were downvoted or rated poorly can be limited in their broadcast areas (e.g., initial broadcast areas and/or re-broadcast areas). For example, certain topics may have been found to be considered problematic or hostile by receiving users, and new posts having such topics can be restricted or scaled down in broadcast areas as described above.

Various blocks and operations of methods 300, 400, 500, and/or 600 can be performed in a different order than shown and/or at least partially simultaneously, where appropriate. For example, some implementations can perform blocks of the methods at various times and/or based on events not related to providing an image for display. In some implementations, blocks can occur multiple times, in a different order, and/or at different times in the methods.

In some implementations, the methods 300, 400, 500, and/or 600 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks, and/or different blocks can be performed on client device or server device, or both types of devices. For example, user input can be received on a client device and broadcast areas can be determined and/or stored on a server device, or vice versa.

Figures 7, 8:
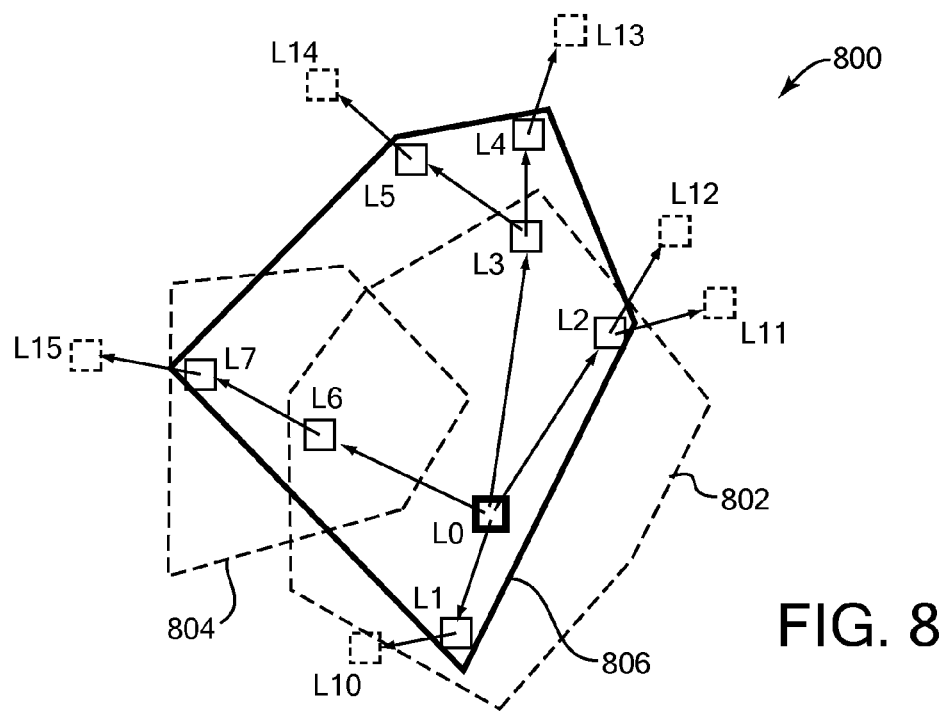
FIG. 7 is a diagrammatic illustration of an example user post history that can be stored and accessed to determine a broadcast area for a content post, according to some implementations.
FIG. 8 is a diagrammatic illustration of an example user broadcast history of a previous content post, according to some implementations.

FIG. 7 is a diagrammatic illustration of a portion of an example user post history 700 that can be stored and accessed to determine a broadcast area for a content post. For example, user post history 700 can be accessed by block 506 of FIG. 5 to determine an initial broadcast area for a current content post. A user post history similar to history 700 can also or alternatively be accessed by block 606 of FIG. 6 to determine a re-broadcast area for a received content post, e.g., for a second user.

The example post history 700 includes a list 702 of previous content posts originated by a particular user, indicated by an identification shown as P1, P2, P3, etc. Post history 700 also includes a broadcast history 704 that includes a list of individual broadcast histories, e.g., each individual broadcast history associated with a listed post. The broadcast history 704 can include the geographic locations at which the associated posts were previously broadcast. In this example, the relevant previous posts to a current content post are shown, where the relevant previous posts are posts that were initially broadcast by the user from a location similar to the broadcasting location of the current content post. For example, if the first device is currently located at a location described by geographical coordinates (30, −98) (e.g., latitude and longitude), the method can check the stored broadcast history associated with content posts from the first user (or from the first device) to determine if any previous posts are relevant, e.g., were initially broadcast from the first device at those same coordinates or at coordinates within a threshold distance of those coordinates. In some implementations, the relevant previous posts used to determine the initial broadcast area can include previous posts initiated at locations different than the current location of the current content post, e.g., initiated within a defined geographic region of the current content post. Some implementations can store the posts 702 and broadcast history as different nodes in a graph structure.

In some implementations, the broadcast history 704 includes geographical locations at which the associated posts were re-broadcast. Some implementations can also include the initial broadcast location in the broadcast history 704, and/or some implementations can include one or more locations at which a post was received and/or output by devices without re-broadcasting the post.

Some implementations can provide each individual broadcast history in the form of a directed graph, indicating directions of propagation of broadcasts of the associated post, e.g., a chain of locations at which the post was broadcast. A directed graph may be stored in multiple ways. For example, the directed graph can be stored as tuples in a database that represent an edge (e.g., a tuple "A,B" may represent a flow from A to B; "B,A" may represent a flow for B to A, etc.). Directed graphs may be stored in other ways, e.g., a graph data structure, a linked list, etc. Some implementations can use one or more post histories to train a model (e.g., a neural network, or using heuristic learning) and the model can then represent the post history, e.g., provide relevant previous posts to a device based on the current post.

In this example, the initial broadcast location is shown as L0, followed by several locations indicating the direction of propagation from one location to the next. Each successive location indicates one or more devices that received the associated post at (or near) that location, where the post was broadcast or re-broadcast by a device previous to that location in the chain. In some implementations, different links can have different strengths. For example, if multiple devices are co-located (e.g., approximately located) at location L1, the link from L0 to L1 can be considered stronger than other links from L0 not pointing to locations having such co-located devices. In some implementations, a link can be assigned or designated in the broadcast history to have a higher strength, e.g., if one of the nodes at a location is removed due to re-factoring a directed graph as described herein.

In some implementations, the method can examine the previous posts 702 in the post history 700 that have an originating location matching the originating location of the current content post (e.g., the current location of the first device). For example, the posts P1, P2, and P3 shown in post history 700 have the same originating or initial location L0 as the current content post. Some implementations can consider a similar initial location to be a match. For example, a previous post that originated at a location within a threshold distance of the location of the current content post can be considered to match. In some implementations, if there is an offset between a previous post's initial location and the content post's initial location, that offset can be used to modify the initial broadcast area as described herein. For example, the greater the offset, the greater amount by which the initial broadcast area can be reduced in magnitude.

FIG. 8 is a diagrammatic illustration of an example spatial user broadcast history 800 of a previous post P1 shown in FIG. 7, where the broadcast history is shown in a graphical format indicating the pattern or shape of the broadcast area of the previous post over a geographical region. Spatial broadcast history 800 includes the locations of the associated broadcast history 704 in a spatial layout, positioned relative to each other in the geographical region covered by the broadcasts of the post P1.

The example spatial user broadcast history 800 is in a form of a directed graph, where each location L0, L1, etc. is shown as a node in the graph that is a location of a device. For example, each node is shown as a solid box that indicates a location of a device that broadcast the previous content post P1. Some locations are shown in dotted lines and indicate that devices at those locations received and/or output to the user (e.g., displayed) a broadcast of the post P1 and did not re-broadcast the post to other devices. Broadcast history 800 indicates directions of propagation of the previous content post P1. An arrow from a first location to a second location indicates that the device at the first location broadcast the content post P1 and it was received by the device at the second location.

In this example, the first user initially broadcast (e.g., originated) the previous content post P1 at location L0. The content post P1 was broadcast to a previous initial broadcast area 802 indicated by dashed lines. This previous initial broadcast area may have been a combination of broadcast histories, e.g., based on content posts broadcast by the first user previously to post P1 near location L0 and/or other broadcast histories.

Devices at four different locations L1, L2, L3, and L6 are in a first broadcast level that received the previous content post P1 broadcast from the originating location L0 and displayed the content post P1 within the previous initial broadcast range 802, as indicated by arrows from location L0 to these locations. In turn, the users at these receiving device locations L1, L2, L3, and L6 decided to re-broadcast the post P1 into re-broadcast areas surrounding their devices, e.g., thereby indicating their approval of the post P1 and their desire to share the post P1. These re-broadcast areas were determined based on the user broadcast history of the users of those devices at those locations, for example. In this example, the device at location L6 has a re-broadcast area 804 determined as indicated by dashed lines, e.g., a scaled-down version of an initial broadcast area for the user at location L6 and based on the user broadcast history of that user. In this example, the devices at locations L1, L2, L3, and L6 only re-broadcast into areas that did not already receive a broadcast of the post P1. For example, the L6 device did not re-broadcast the post P1 into the portion of re-broadcast area 804 that overlaps with the initial broadcast area 802.

Devices in the re-broadcast areas received the content post P1. For example, a second set of devices at locations L11, L12, L4, L5, and L7 in a second broadcast level received and displayed the re-broadcasted post P1 from one of the first set of devices at locations L1, L2, L3, and L6 as shown. The users of some of the second set of devices decided to re-broadcast the post P1 to re-broadcast areas at a third broadcast level based on their user broadcast histories. For example, devices at locations L4 and L5 re-broadcast the post P1 to non-overlapping portions of their re-broadcast areas (not shown). Location nodes shown in dashed lines received and displayed the post P1 but did not rebroadcast the post P1, including locations L10-L15.

A new initial broadcast area for the current content post can be determined based on the broadcast history of post P1 (and other broadcast histories of other previous content posts). In this example, a spatial broadcast area 806 can be based on the shown locations at which a re-broadcast was made. In this example, the re-broadcasting locations L1-L7 can be used to determine the broadcast area 806 and non-broadcasting locations L10-L15 are not used in this determination. In other implementations, one or more of the locations L10-L15 can also be used in the determination of the broadcast area 806.

The broadcast area 806 in this example can be an area defined by line segments drawn between the outer locations that performed a re-broadcast, e.g., the locations furthest from the origin broadcast location L0. Locations within the area defined by these segments can be considered to be within the broadcast area 806. Various other ways of determining the broadcast area can alternatively or also be used. For example, in some implementations, the region can be convex or otherwise curved. In some implementations, the broadcast area can include only disjoint radii around locations which received the post. For example, the broadcast area can be determined to include a particular radius area around each location that is considered to be within the broadcast area (e.g., each device location that performed a re-broadcast). The particular radius can have a predefined magnitude, or can have a magnitude based on one or more characteristics of the user, device, and/or location at which it is determined. In some implementations, the broadcast area can include an area including and surrounding a straight path from each broadcasting device to each qualifying receiving device (e.g., a receiving device that re-broadcasts the post). Other shapes of broadcast areas can alternatively be determined based on the re-broadcast locations.

The user broadcast area 806 for post P1 can be combined with broadcast areas based on other relevant previous content posts. For example, a user broadcast area related to each relevant previous post P2 and P3 previously broadcast by the same user can be determined similarly to user broadcast area 806. The user broadcast areas from posts P1, P2 and P3 can be combined together (e.g., summed or joined in area, with duplicated areas determined as single areas) to provide a resulting user broadcast area for the current content post as described herein, e.g., with reference to FIGS. 5 and 6. In some implementations, the resulting user broadcast area can be stored and can be updated or re-determined in response to one or more new content posts being broadcast by the user at a location the same or similar to the location L0. A resulting user broadcast area can also be combined with other broadcast areas, e.g., based on content data of posts such as topics, as described herein. In some implementations, a re-broadcast area for the current content post can be similarly determined based on the user post history of the device performing the re-broadcast.

Figures 9, 10:
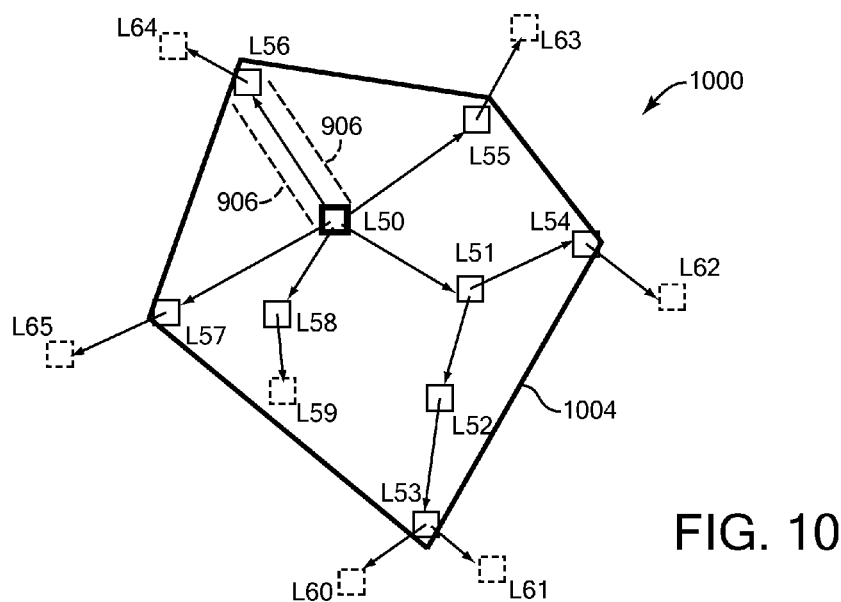
FIG. 9 is a diagrammatic illustration of an example topic post history that can be stored and accessed to determine a broadcast area for a content post, according to some implementations.
FIG. 10 is a diagrammatic illustration of an example topic broadcast history of a previous content post, according to some implementations.

FIG. 9 is a diagrammatic illustration of an example portion of a topic post history 900 that can be stored and accessed to determine a topic broadcast area for a content post. For example, block 510 of FIG. 5 can access the topic post history 900 for the determination of an initial broadcast area for the current content post. Similar to post history 700 of FIG. 7, post history 900 includes a list 902 of previous posts, and a broadcast history 904 including a list of individual broadcast histories, e.g., each individual broadcast history associated with a listed post.

In some implementations, the posts in list 902 can be organized based on topics included in the content data of the posts. For example, the topics can be provided in a list 901. In this example, a topic T1 is included in an associated list of posts including posts P6 and P7, and the individual broadcast history of locations for each of these posts is stored in association with the posts. For example, the topic T1 is included post P6 and the same topic T1 is also included in post P7. A topic T2 in list 901 is included in post P8 and the associated individual broadcast history is shown for post P8. If post P6 also included topic T2, then topic T2 would also include a reference to post P6 and its individual broadcast history (e.g., where post P6 has the same individual broadcast history with respect to topic T1 and with respect to topic T2).

In this example, the listed posts 902 can be previous posts that are relevant to the current content post. For example, the topics T1 and T2 may be included in the content data of the current content post, e.g., topics that match listed topics T1 and T2 may be included in the current content post. In addition, in some implementations these previous posts are relevant since they were initially broadcast from a location similar to (e.g., within a threshold distance of) the broadcast location of the current content post (e.g., which can be the current location of the device that will broadcast the current content post). In some implementations, the threshold distance in which topic-related previous posts are considered relevant can be different than a threshold distance in which user-related previous posts of FIG. 7 are considered relevant. For example, the threshold distance for topic-related posts can be made larger than for user-related posts if topics are determined to be popularly broadcast over a region by many users.

The individual broadcast history 904 for post P6 can include a list of geographic locations at which the associated post was broadcast. Additional information can be stored in post history 900 in some implementations, e.g., date and time of broadcast of the post, user names and/or device identifications for devices performing the broadcasts of the post, user ratings or comments, etc. Some implementations can consider and use such additional information in the determination of initial broadcast area of a current content post. For example, a smaller weight can be used for, and/or an adjustment providing a smaller broadcast area can result from, an older previous post as compared to a more recent previous post.

In some implementations, topic post history 900 can be stored by a server or other device that receives post information from multiple users and devices. For example, the server can maintain a list of various topics that have been included in content posts of various users. Some implementations can store topic post history 900 at storage devices of one or more client devices.

In some implementations, the topic post history 900 can be part of a larger list of topics that have been included in previous content posts transmitted by devices of one or more users. In some examples, the larger list of topics can be associated with a particular geographic region (e.g., region topics), and each of multiple geographic regions can include its own topic post history. In some examples, if a device originates a content post, the method can consult the list of region topics associated with the current geographic region that includes the device's current location. The method can search the list of region topics associated with the current region. As described above, in some implementations, region topics can be tracked and ranked for popularity (e.g., based on how many times they are included in broadcast content posts, based on weights of influence of the users broadcasting the posts, recency of topics in the post, etc.). For example, if the current content post has one or more popular topics, it can be provided with a greater initial broadcast area and/or re-broadcast areas, and/or the broadcast areas of previous posts having those topics can be increased in their magnitude for determining an initial broadcast area for the current content post. In some examples, topics can be checked as to their popularity in the associated region within a particular time window.

FIG. 10 is a diagrammatic illustration of an example spatial topic broadcast history 1000 of a previous post P6 having a topic T1 as shown in FIG. 9, where the broadcast history is shown in a graphical format indicating the pattern or shape of broadcasts over a geographical region. Spatial broadcast history 1000 includes the locations of the associated broadcast history 904 in a spatial layout, positioned relative to each other in the geographical region covered by the broadcasts of the post P6.

Similarly to FIG. 8, the broadcast history is shown in a form of a directed graph where each location L50, L51, etc. shown as a node in the graph that is a location of a device. For example, each node is shown as a solid box that indicates a location of a device that broadcast the previous content post P6. Some locations are shown in dotted lines that indicate that devices at those locations received and output to the user (e.g., displayed) a broadcast of the post P6 and did not re-broadcast the post to other devices. The example spatial broadcast history 1000 indicates directions of propagation of the previous content post P6, similarly to the directed graph of FIG. 8.

In this example, a user initially broadcast the previous post P6 at location L50. Devices at five different locations L51, L55, L56, L57, and L58 received the post P6 from location L50 and displayed the post P6 within the initial broadcast range, as indicated by arrows from location L50 to these locations. In turn, the users at these five device locations decided to re-broadcast the post P6, e.g., thereby indicating their approval (e.g., liking) of the post P6 and their desire to share the post P6. Each device at the five locations broadcast the post P6 into re-broadcast areas surrounding their devices. The re-broadcast areas were determined based on the user broadcast history of the users of those devices at those locations, for example. In this example, the devices at the five locations only re-broadcast into areas that did not already receive a broadcast.

Additional devices at locations L52, L54, L59, L63, L64, and L65 received and displayed the re-broadcasted post P6 from one of the five devices at locations L51, L55, L56, L57, and L58 as shown. The users of some of these devices (nodes shown in solid lines) decided to re-broadcast the post P6 to re-broadcast areas based on their user broadcast histories, while the users of others of these devices (nodes shown in dashed lines) did not command a re-broadcast of the post P6, including devices at locations L60-L65. In some implementations, the locations that did not re-broadcast the post P6 are not included in the broadcast history 1000 or 900, and in other implementations these locations can be included in the broadcast histories.

A topic broadcast area can be determined based on the broadcast history of post P6. In this example, a topic broadcast area 1004 is based on the locations at which a re-broadcast was made. In some implementations, as in the example shown, the locations L51-L58 are used to determine the topic broadcast area 1004 and locations L59-L65 are not used in this determination. In other implementations, one or more of the locations L59-L65 can also be included in the determination of the broadcast area 1004.

The topic broadcast area 1004 in this example is an area defined by line segments drawn between the outermost locations that performed a re-broadcast, e.g., the locations furthest from the origin broadcast location L50. Locations within the area defined by these segments can be considered to be within the topic broadcast area 1004. Various other ways of determining the broadcast area can alternatively or also be used, similarly as described for FIG. 8. For example, in various implementations, the broadcast area can be convex or otherwise curved, or can be determined to include a particular radius area around each location that is considered to be within the broadcast area (e.g., each device location that performed a re-broadcast). The particular radius can have a predefined magnitude, or can have a magnitude based on one or more characteristics of the user, device, and/or location at which it is determined. In some implementations, the broadcast area can include an area including and surrounding a straight path from each broadcasting device to each qualifying receiving device (e.g., a receiving device that re-broadcasts the post). For example, this area surrounding the straight path can have a predetermined width or width determined based on characteristics of the post P6, location, user, etc. In this example, the straight path extends down the center of the area, as shown in example area portion 1006 of FIG. 10. The broadcast area can be determined with other shapes in other implementations.

The topic broadcast area 1004 for post P6 can be combined with topic broadcast areas based on other relevant previous content posts, e.g., other previous content posts that included the topic T1. For example, previous post P7 is known from list 902 to have included topic T1, and a topic broadcast area related to the relevant previous post P7 can be determined similarly to topic broadcast area 1004. The broadcast areas from posts P6 and P7 can be combined together (e.g., summed or joined in area, with duplicated areas determined as single areas) to provide a resulting topic broadcast area for the topic broadcast history as described herein, e.g., with reference to FIGS. 5 and 6. In some implementations, the resulting topic broadcast area can be stored and can be updated or re-determined in response to one or more new content posts being broadcast at a location the same or similar to the location L50, and/or in a predefined geographical region in which location L50 is located.

In some implementations, as in block 514 of FIG. 5, the resulting user broadcast area determined with reference to FIGS. 6 and 7 can be combined with the resulting topic broadcast area determined with reference to FIGS. 9 and 10, in addition to being combined with any other resulting broadcast areas (e.g., from topic T2 shown in FIG. 9). The total broadcast area can be the initial broadcast area for the current content post. The resulting broadcast areas can be weighted and/or scaled based on any of a variety of factors in the combining, as described above with reference to FIG. 5.

Figure 11:
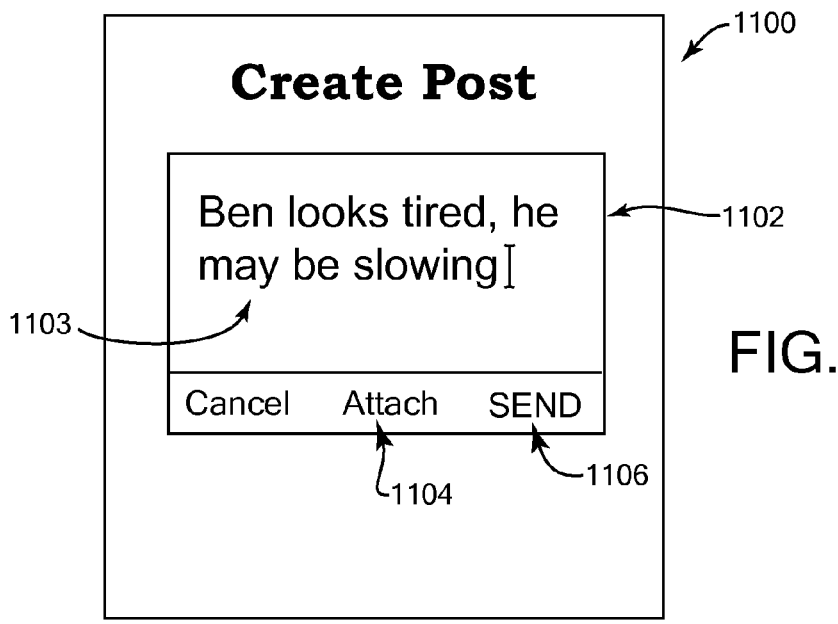
FIGS. 11 and 12 are diagrammatic illustrations of example user interfaces that can be used with one or more described content post features, according to some implementations.

FIG. 11 is a diagrammatic illustration of an example user interface 1100 that can be used with one or more content post features described herein. In various implementations, user interface 1100 can be displayed by a display device, e.g., by a display screen of a client device 120, 122, 124, and/or 126 of FIG. 1, or a server system 102 in some implementations. In this example, user interface 1100 can be displayed by a communication program (or other application program) running on a device which can broadcast content posts to particular geographic areas as described herein.

Interface 1100 can provide a content post creation function that allows a user of a device to create and broadcast a user content post. In this example, a user can provide user input to cause the generation of text 1103 in a text window 1102, e.g., using any of a number of connected input devices (touchscreen, pointing device, voice commands, etc.). Text 1103 can be included as content data in a current user content post. In some implementations, other types of content can be included in content data of the user content post. For example, an attach control 1104 can be selected by the user to attach a file or other collection of content data, e.g., text, one or more images, video data, audio data, documents, etc.

A user can select the send control 1106 to cause the device to broadcast a current user content post including text 1103 by the user in text box 1102 and/or one or more attachments attached via attach control 1104. This current user content post is initiated by the user, and an initial broadcast area is determined as described above. The current content post is transmitted such that devices physically located in that initial broadcast area receive and output the current user content post.

Figure 12:
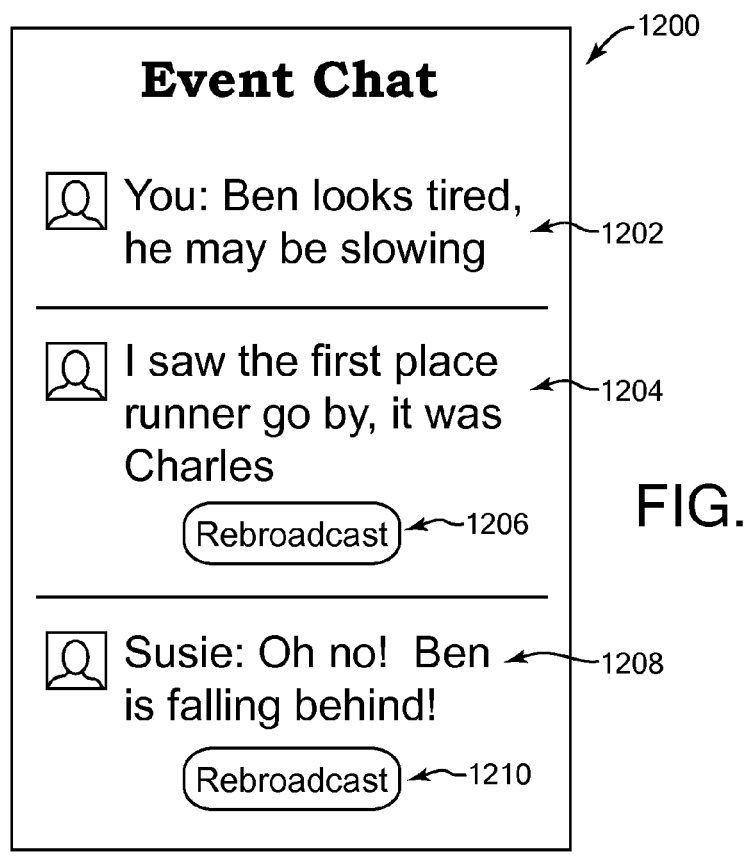

FIG. 12 is a diagrammatic illustration of another example user interface 1200 that can be used with one or more content post features described herein. In various implementations, user interface 1200 can be displayed by a display device, e.g., on a display screen of a client device 120, 122, 124, and/or 126 of FIG. 1, or a server system 102 in some implementations. In this example, user interface 1200 can be displayed by a communication program, chat program, and/or other application program running on a device which can receive content posts being broadcast as well as broadcast content posts to particular geographic areas as described herein. In this example, user interface 1200 is displayed on the same device that displayed user interface 1100.

User interface 1200 can provide a chat or conversation interface function that allows the device to display content posts that have been sent and/or received by the device. In this example, the interface 1200 can display the user's own created text 1202 that was created and broadcast in a user content post as described for FIG. 11. This text 1202 was broadcast to an initial broadcast area and received and output by other devices in that area.

User interface 1200 can also display content data of received content posts broadcast from other devices. For example, text 1204 was sent by a different device and was received in a user content post by the device displaying the interface 1200. The received content post may have been initially broadcast by the different device to an initial broadcast area in which the receiving device is currently located, or the received content post may have been re-broadcast by the different device that received the content post from a third device. The user who broadcast the text 1204 has selected to remain anonymous such that no user name or other user identification is displayed on any receiving device, and no originating user is indicated for the text 1204 by any receiving device. In this example implementation, since it is a received content post, a re-broadcast control 1206 can be displayed next to (or displayed otherwise associated with) the text 1204. The re-broadcast control 1206, if selected by user input, causes the device to broadcast the same post 1204 to a broadcast area, e.g., a re-broadcast area surrounding the device displaying the user interface 1200 as described above with respect to FIG. 4.

Similarly, text 1208 was included as content data in a content post received by the device displaying user interface 1200 from a fourth device. The received content post was sent by a user who did not select to be anonymous (e.g., which can be indicated by data in the received content post in some implementations) such that the user interface 1200 displays the name of the originating user of the text 1208 in association with the text 1208. A re-broadcast control 1210, if selected by user input received by the device displaying user interface 1200, causes the device to broadcast the text 1208 in a content post to a broadcast area, e.g., a re-broadcast area surrounding the device displaying the user interface 1200 as described herein.

In some implementations, other types of content data in received content posts can be displayed and/or otherwise output by the device via user interface 1200 and can be selected for re-broadcast. For example, content data received via an attach control 1104 of FIG. 11 can be displayed, such as one or more images, video clips, documents, etc. In some implementations, attached audio data can be output, e.g., via speakers of the device displaying the user interface 1200.

Some implementations can use stored broadcast histories as described above to determine particular characteristics of content post broadcasts in a particular geographical region. For example, stored and updated broadcast histories of content posts can provide directions of propagation of content data based on the directed graphs described above. Such directions of propagation can be examined to determine geographic sources of user content (and/or other content data) related to particular topics or brands, as well as determine how interest in that user content spreads across the area via re-broadcasts. In one example, it may be determined that user content posts related to a certain type of food have been recently originating from particular areas of a city. Such information can be used to analyze trends in buying habits for that type of food, indicating where buying trends may emerge and showing directions of geographical spread of the buying habits to other persons. Advertising and other marketing can also be based on such information. For example, advertising for the type of food can be concentrated in geographic areas indicated to be at the edge of the current extent of content posts related to that type of food. In some implementations, such information may be used for advertising or marketing purposes with permission by users whose content posts are used in the analysis.

Some implementations can determine broadcast areas similarly as described above, but for broadcast messages or posts that are or include different types of data communicated between devices, e.g., other than content data. For example, a broadcast of messages or posts including control data for controlling a device or program or updating states of a device or program, or other types of data, can be broadcast to geographic areas using one or more of the features described above, e.g., based on previous broadcasts of messages or posts having related or similar data.

Figure 13:
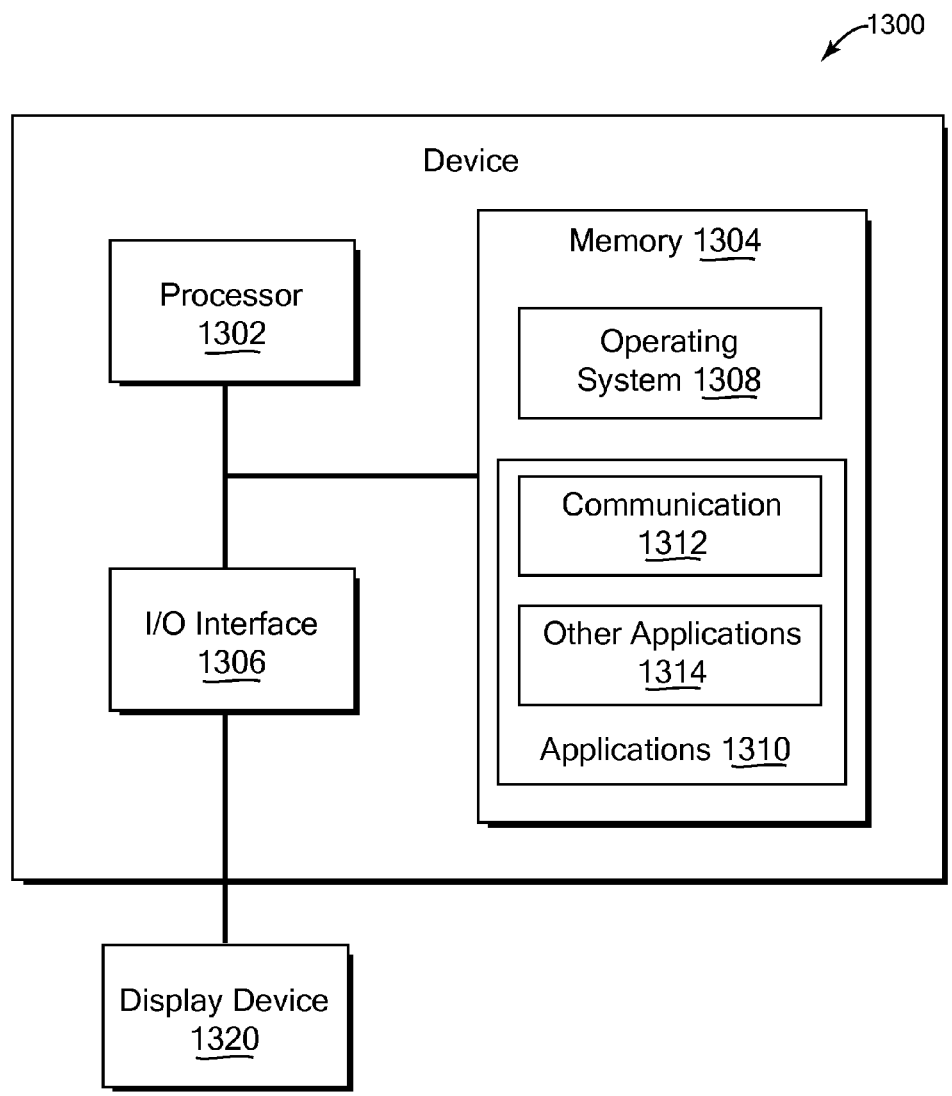
FIG. 13 is a block diagram of an example device which may be used for one or more implementations described herein.

FIG. 13 is a block diagram of an example device 1300 which may be used to implement one or more features described herein. In one example, device 1300 may be used to implement a computer device used to implement a client device, e.g., any of the first device, second device, and/or other devices described herein (for example, client devices 120-126 of FIG. 1), and perform appropriate method implementations described herein. Device 1300 can be any suitable computer system, server, or other electronic or hardware device. For example, the device 1300 can be a desktop computer, portable or laptop computer, or electronic device (portable device, mobile device, cell phone, smart phone, tablet computer, television, TV set top box, personal digital assistant (PDA), media player, game device, wearable device (wristwatch, goggles, glasses, armband, headgear, clothing device, jewelry, etc.). In some implementations, device 1300 can be a server system, mainframe computer, workstation, etc. In some implementations, device 1300 includes a processor 1302, a memory 1304, and input/output (I/O) interface 1306.

Processor 1302 can be one or more processors and/or processing circuits to execute program code and control operations of the device 1300, including one or more blocks or other operations as described herein. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the server device 1300 by the processor 1302, including an operating system 1308 and one or more applications 1310, e.g., a graphics editing engine, web hosting engine, social networking engine, etc. In some implementations, applications 1310 can include instructions that enable processor 1302 to perform the functions described herein, e.g., some or all of the methods of FIGS. 3 and 4 and/or interface of FIG. 5. For example, applications 1310 can include one or more communication applications 1312, including an application program using one or more features described herein to transmit and receive data. A communication application 1312 can, for example, provide communication functionality between the device 1300 and other devices, e.g., chat functionality, text messaging, content messaging, telephone functions, etc. In some implementations, the communication application can provide a user interface to receive user input to determine content data, and output content posts including the content data via a network or other communication medium. The communication application 1312 can also receive content posts and other data and cause a display in a user interface appropriate to the received data. Other applications or engines 1314 can also or alternatively be included in applications 1310, e.g., media display applications, web hosting engine or application, social networking engine or application, etc. Any of software in memory 1304 can alternatively be stored on any other suitable storage location or non-transitory computer-readable medium. In addition, memory 1304 (and/or other connected storage device(s)) can store broadcast history data for content posts, topics, criteria for determining broadcast areas, and other instructions and data used in the features described herein. Memory 1304 and any other type of storage (magnetic disk, optical disk, magnetic tape, or other tangible media) can be considered "storage devices."

I/O interface 1306 can provide functions to enable interfacing the device 1300 with other systems and devices. For example, network communication devices, storage devices (e.g., memory and/or database 106), and input/output devices of the device 1300 can communicate via I/O interface 1306. In some implementations, the I/O interface can connect to interface devices including input devices (buttons, touchscreen, keyboard, pointing device, microphone for capturing sound for audio data, camera or scanner for capturing images or video, etc.) and/or output devices (display screen and/or other display devices, speaker devices, radio transmitters, motor, etc.). Display device 1320 is one example of an output device that can be used to display content, e.g., content data included in an outgoing or received content post. Display device 1320 can be connected to device 1300 via local connections (e.g., display bus) and/or via networked connections and can be any suitable display device. For example, a display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

For ease of illustration, FIG. 13 shows one block for each of processor 1302, memory 1304, I/O interface 1306, and software blocks 1308 and 1310. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein. While device 1300 is described as performing operations as described in some implementations herein, any suitable component or combination of components of the device or similar system, or any suitable processor or processors associated with such a system, may perform the operations described.

In some implementations, device 1300 can include a server device, e.g., a server device 104 of FIG. 1, and perform at least portions of appropriate method implementations described herein. For example, the device 1300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). An operating system, software and applications suitable for the server device can be provided in memory and used by the processor, e.g., client group communication application software, etc. The I/O interface for a client device can be connected to network communication devices, as well as to input and output devices, e.g., a microphone, a camera or scanner, audio speaker devices, a display device for outputting images or video, or other output devices, similarly as described above.

One or more methods described herein (e.g., methods 300, 400, 500, and/or 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display), and/or sends content post parameters and receives from the server determined broadcast areas and/or other parameters for a content post. In another example, all computations can be performed within the mobile app (and/or other apps) on the mobile computing device. In another example, computations can be split between the mobile computing device and one or more server devices.

For example, in some implementations, one or more central servers can store broadcast history (e.g., store all posts along with their location, store graph-structure for all receiving devices for the post, and further graph-structure for re-broadcasts). This can be a social-network style implementation in some examples. In some implementations, one or more originating and/or rebroadcasting devices can locally store broadcast history (e.g., send a content post out, and automatically receive back broadcast history data describing broadcast parameters including re-broadcast locations, identity of re-broadcasting devices or users, etc.). In some implementations, a p2p network configuration can be used. Some implementations can store a partial broadcast history, e.g., store the first X of N total broadcast levels (e.g., where an Xth broadcast level indicates locations receiving the post after X serial broadcasts). In one example, for particularly popular posts, it may suffice to store the first X broadcast levels and then indicate that the post is popular over a large area without storing re-broadcast locations (e.g., store that post originated in a downtown cities, propagated to adjacent cities, and then exploded in propagation all around a region).

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to broadcast data, the method comprising:
  obtaining an indication at a user device to broadcast a new content post;
  determining a broadcast area for the new content post based on a stored broadcast history associated with one or more previous content posts related to the new content post, wherein the stored broadcast history indicates one or more previous geographical locations where the one or more previous content posts related to the new content post were previously received by one or more first mobile devices via one or more previous broadcasts, and wherein determining the broadcast area includes defining at least one of a geographical size and a geographical shape of the broadcast area based on the one or more previous geographical locations of the stored broadcast history where the one or more previous content posts were previously received; and broadcasting the new content post, wherein the broadcasting is configured such that the new content post is to be received by one or more receiving devices located in the broadcast area.

2. The method of claim 1, wherein the broadcast area defines a geographic area in which devices are eligible to receive the new content post, wherein the one or more previous content posts are a plurality of previous content posts, and wherein determining the broadcast area includes:

determining a resulting broadcast area that includes a combined area of a plurality of different broadcast areas associated with the plurality of previous content posts; and determining the broadcast area based on the resulting broadcast area.

3. The method of claim 1, wherein the stored broadcast history includes:

a user broadcast history of a user that indicates a first set of the one or more previous geographic locations where one or more previous user posts of the one or more previous content posts were initiated in an initial broadcast by the user and were re-broadcast by a first set of mobile devices of the one or more first mobile devices that received the one or more previous user posts in the initial broadcast; and a topic broadcast history of one or more topics included in the new content post, wherein the topic broadcast history indicates a second set of the one or more previous geographic locations where one or more previous topic posts of the one or more previous content posts associated with least one of the one or more topics were re-broadcast by a second set of mobile devices of the one or more first mobile devices that received the one or more previous topic posts, wherein the broadcast area is based on the user broadcast history and the topic broadcast history such that the broadcast area includes the first set of the one or more previous geographic locations and the second set of the one or more previous geographic locations.

4. The method of claim 1, wherein the one or more geographic locations are a plurality of different previous geographical locations, and wherein defining at least one of the geographical size and the geographical shape of the broadcast area includes defining the shape of the broadcast area to include the plurality of different previous geographical locations.

5. The method of claim 4, wherein determining the broadcast area includes:

determining the geographical size of the broadcast area based on a distance of a current geographical location of the user device to at least one of the one or more previous geographical locations, wherein the size of the broadcast area is determined to be a first size in response to the distance being a first distance, and the size of the broadcast area is determined to be a second size smaller than the first size in response to the distance being smaller than the first distance.

6. The method of claim 1, wherein the stored broadcast history is a stored data broadcast history related to content data of the new content post, wherein the one or more previous content posts include at least a portion of content data similar to at least a portion of the content data of the new content post.

7. The method of claim 6, wherein the content data includes one or more topics included in a text message input by a user, and the stored data broadcast history includes a stored topic broadcast history, and wherein determining the broadcast area includes:

referencing one or more stored region topics previously broadcast in a geographical region by a plurality of mobile user devices to other mobile user devices, wherein the geographical region includes a current geographical location of the user device;

determining that one or more topics in the new content post are similar to one or more corresponding region topics of the one or more stored region topics, wherein content posts associated with the one or more corresponding region topics were previously broadcast to one or more topic geographical locations by at least some of the plurality of mobile user devices; and using one or more individual broadcast histories associated with the corresponding region topics to determine the broadcast area, wherein the broadcast area is defined to include the one or more topic geographical locations.

8. The method of claim 7, wherein determining the broadcast area includes using respective ranks of the one or more corresponding region topics to scale a size of the broadcast area, wherein the one or more stored region topics are ranked based at least in part on a number of times that the one or more stored region topics have been broadcast by the plurality of mobile user devices.

9. The method of claim 1, wherein the stored broadcast history indicates the one or more previous geographical locations where the one or more previous content posts related to the new content post were previously received by the one or more first mobile devices and, after being previously received, were previously re-broadcast by the one or more first mobile devices to be received by one or more second mobile devices, and wherein determining the at least one of the geographical size and the geographical shape of the broadcast area is based on the one or more previous geographical locations where the one or more previous content posts were previously received by the one or more first mobile devices and were previously re-broadcast to be received by the one or more second mobile devices.

10. The method of claim 9, wherein the one or more previous broadcasts are a plurality of previous broadcasts, the one or more previous content posts are a plurality of previous content posts, and the one or more previous geographical locations are a plurality of previous geographical locations, wherein the broadcast history is stored as one or more directed graphs of the plurality of previous geographical locations, wherein the one or more directed graphs indicate one or more directions of broadcast flow in the plurality of previous broadcasts of the plurality of previous content posts to the one or more first mobile devices and from the one or more first mobile devices to the one or more second mobile devices at the plurality of previous geographical locations.

11. The method of claim 9, wherein the new content post is a user content post initiated by a user and includes content data provided by the user, wherein the stored broadcast history is a stored user broadcast history that indicates that the one or more previous content posts were initiated in the one or more previous broadcasts by the user in at least one previous geographical location of the one or more previous geographical locations, and wherein the one or more previous content posts are related to the new content post based on the user causing the one or more previous broadcasts of the one or more previous content posts to the one or more first mobile devices.

12. The method of claim 11, wherein the one or more previous content posts are determined to be related to the new content post by having been previously broadcast from the at least one previous geographical location that is within a threshold distance of a current geographical location of the user device, wherein the new content post includes text content not in the one or more previous content posts.

13. A system to broadcast data, the system comprising:
a storage device; and
at least one processor operative to access the storage device and configured to:
receive a current content post in a received broadcast sent by a sending device and store the current content post in the storage device;
obtain an indication to broadcast the current content post;
determine a re-broadcast area based on a stored broadcast history associated with a user of the system, wherein the stored broadcast history indicates a plurality of different geographical locations at which one or more previous content posts were previously received by one or more previous receiving mobile devices via one or more previous broadcasts, wherein determining the re-broadcast area includes determining a geographical shape of the re-broadcast area, wherein the geographical shape is defined based on the plurality of different geographical locations; and
broadcast the current content post, wherein the broadcast is configured such that the current content post is receivable by one or more receiving devices located in the re-broadcast area.

14. The system of claim 13, wherein the at least one processor is configured to determine the re-broadcast area based on the stored broadcast history for the one or more previous content posts that were sent in the one or more previous broadcasts initiated by the user of the system, wherein at least one of the plurality of different geographical locations is within a particular distance of a location from which the system initiated at least one previous broadcast of the one or more previous broadcasts.

15. The system of claim 13, wherein the current content post includes a message that includes text that was input at the sending device the at least one processor is configured to receive the current content post in
the received broadcast that is a re-broadcast by the sending device based on a prior broadcast received by the sending device.

16. The system of claim 13, further comprising a display device, wherein the at least one processor is further configured to cause a display of the current content post by the display device,
wherein the stored broadcast history indicates the plurality of different geographic locations at which:
the one or more previous content posts were previously received by the one or more previous receiving mobile devices via the one or more previous broadcasts, and
the one or more previous content posts were previously re-broadcast by the one or more previous receiving mobile devices to one or more other mobile devices as commanded by respective users of the one or more previous receiving mobile devices.

17. The system of claim 13, wherein the at least one processor is configured to modify a size of the re-broadcast area from a first geographical area to a second geographical area based at least in part on an amount of the previous content posts that were initiated in a geographic region of the system by one or more initiating devices located in the geographic region, wherein the size is determined to be a first size in response to the amount of the previous content posts being a first amount, and the size is determined to be a second size larger than the first size in response to the amount of the previous content posts being larger than the first amount.

18. The system of claim 13, wherein the current content post is associated with a current broadcast history including one or more previous geographical locations at which the current content post was previously broadcast by one or more previous receiving devices, and wherein the at least one processor is further configured to:
store a current geographical location of the system in the current broadcast history of the current content post.

19. The system of claim 18, wherein the at least one processor is configured to store the current broadcast history of the content post as a directed graph including the one or more previous geographical locations at which the current content post was previously broadcast by the one or more previous receiving devices, and wherein the at least one processor is configured to store the current geographic location of the system by adding the current geographical location as a node to the directed graph.

20. A non-transitory computer readable medium having stored thereon software instructions to implement broadcast of content data and, when executed by a processor, cause the processor to perform operations including:
receiving a command at a user device from a user to broadcast a current content post stored by the user device;
determining an initial broadcast area based on:
a) a stored user broadcast history of the user indicating a plurality of first previous geographical locations that define first broadcast areas in which a first set of previous content posts initiated by the user were received by one or more first mobile devices; and
b) a stored topic broadcast history indicating a plurality of second previous geographical locations that define second broadcast areas in which a second set of previous content posts were received by one or more second mobile devices as provided from one or more other user devices, wherein the second set of previous content posts includes content data topics that are included in the current content post,
wherein the initial broadcast area includes a combined area that is a combination of the first broadcast areas and the second broadcast areas; and
broadcasting the current content post, wherein the broadcasting is configured such that the current content post is receivable by one or more first devices in the initial broadcast area and is not receivable by one or more second devices not in the initial broadcast area.

* * * * *